United States Patent [19]

Mehta et al.

[11] Patent Number: 4,529,320
[45] Date of Patent: Jul. 16, 1985

[54] ROTARY PROCESSORS AND METHOD FOR DEVOLATILIZING MATERIALS

[75] Inventors: Pradip S. Mehta; Lefteris N. Valsamis, both of West Haven, Conn.; Zehev Tadmor, Haifa, Israel

[73] Assignee: USM Corporation, Farmington, Conn.

[21] Appl. No.: 532,166

[22] Filed: Sep. 14, 1983

[51] Int. Cl.³ .......................... B01F 5/12; B01F 13/06
[52] U.S. Cl. ........................................ 366/75; 366/76; 366/77; 366/99; 366/262; 366/315
[58] Field of Search .............................. 366/69, 75–77, 366/91, 96–99, 136, 262–265, 302–307, 336, 337, 340; 425/224, 374, 466

[56] References Cited

U.S. PATENT DOCUMENTS

| | | | |
|---|---|---|---|
| 3,992,500 | 11/1976 | Kruder | 366/75 |
| 4,142,805 | 3/1979 | Tadmor | 366/97 |
| 4,194,841 | 3/1980 | Tadmor | 366/97 |
| 4,213,709 | 7/1980 | Valsamis | 366/99 |
| 4,227,816 | 10/1980 | Hold et al. | 366/99 |
| 4,255,059 | 3/1981 | Hold et al. | 366/97 |
| 4,300,842 | 11/1981 | Hold et al. | 366/99 |
| 4,329,065 | 5/1982 | Hold et al. | 366/97 |
| 4,389,119 | 6/1983 | Valsamis et al. | 366/99 |
| 4,402,616 | 9/1983 | Valsamis et al. | 366/99 |
| 4,411,532 | 10/1983 | Valsamis et al. | 366/99 |
| 4,413,913 | 11/1983 | Hold et al. | 366/75 |
| 4,421,412 | 12/1983 | Hold et al. | 366/76 |

*Primary Examiner*—Robert W. Jenkins
*Assistant Examiner*—Arthur D. Dahlberg
*Attorney, Agent, or Firm*—Frances P. Craig

[57] ABSTRACT

Novel rotary processors and devolatilizing methods which provide extremely efficient devolatilization of materials, including viscous and visco-elastic materials and which involve a devolatilizing stage including a rotatable element carrying a plurality of annular channels and a stationary element providing a coaxial closure surface operationally arranged with the channels to provide enclosed processing passages. Each passage of the devolatilizing stage includes inlet means, outlet means and a channel blocking member all associated with the stationary element and arranged and adapted so that material fed to the inlet can be carried forward by the rotatable channel walls to the blocking member for discharge from the passage. The passages are interconnected by material to transfer grooves formed in the closure surface and operationally communicate with a vacuum source to provide a highly efficient devolatilizing stage.

The novel devolatilizing stage is characterized by features which provide control of the processing volume available within the passages and of the transfer volume available within the transfer grooves. These volumes may then be coordinated with other processing variables to effect a foam devolatilizing mechanism in which nucleation of bubbles of volatiles within the material, bubble growth and bubble rupture occur during substantially plug-flow movement alternating with non-pressurizing shearing within the novel devolatilizing stage.

9 Claims, 25 Drawing Figures

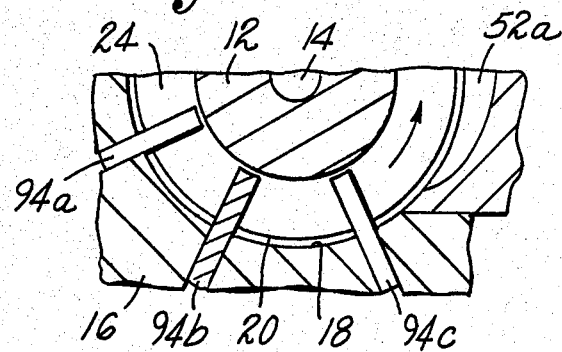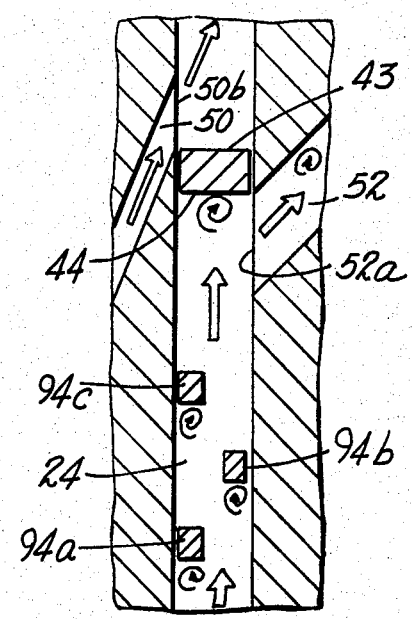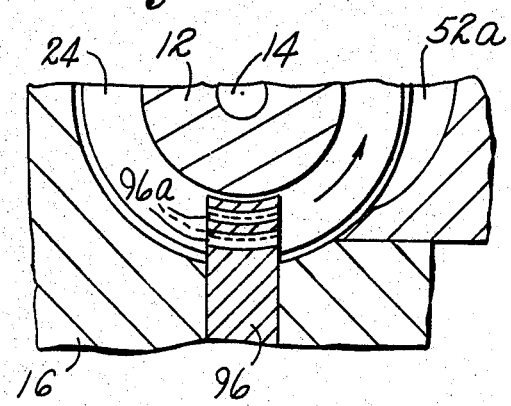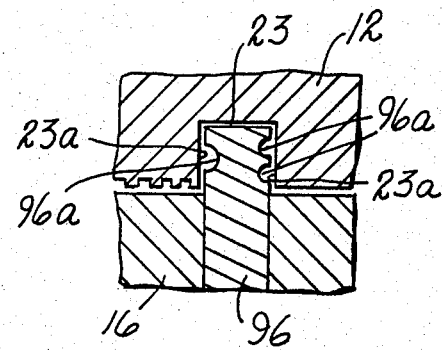

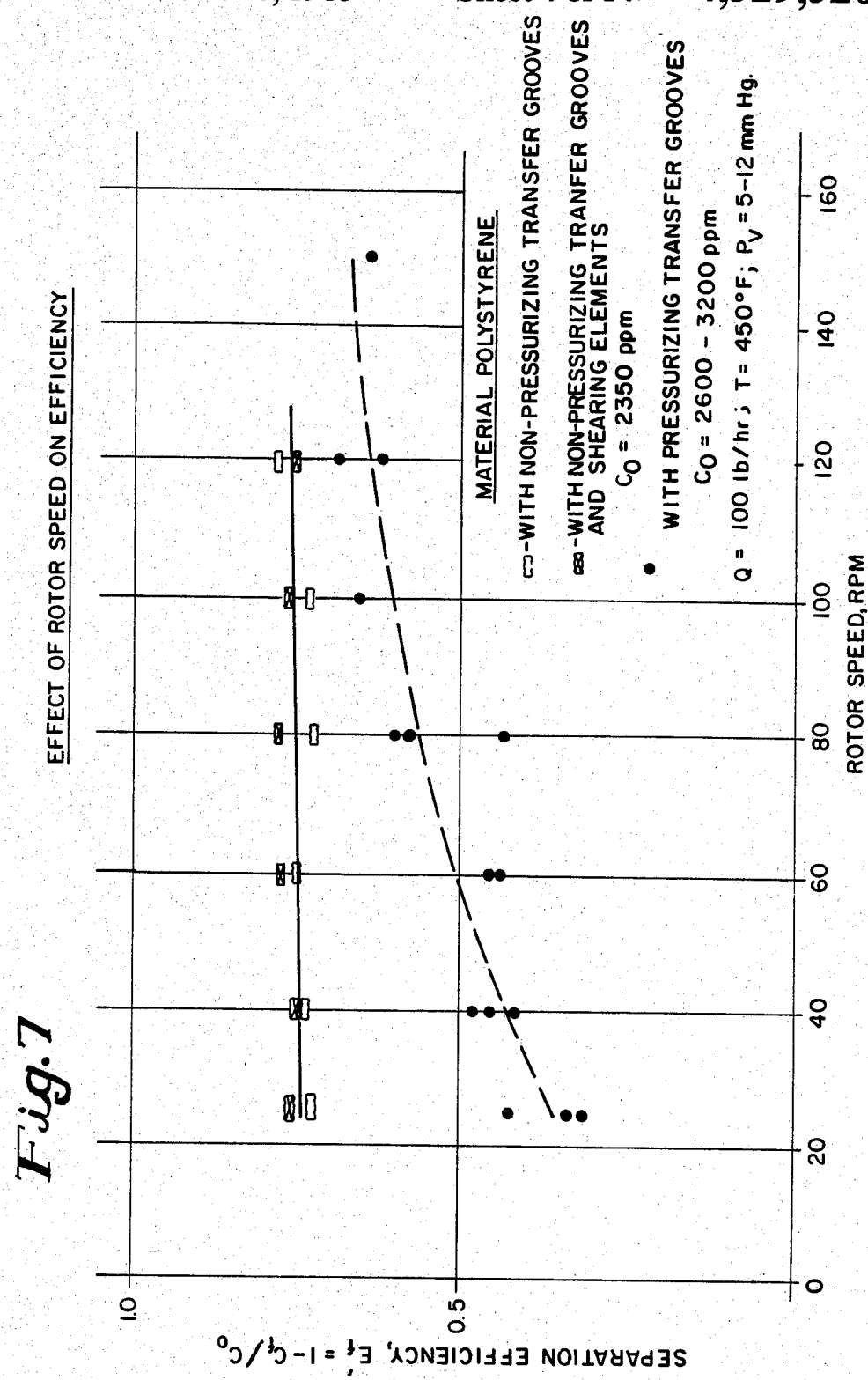

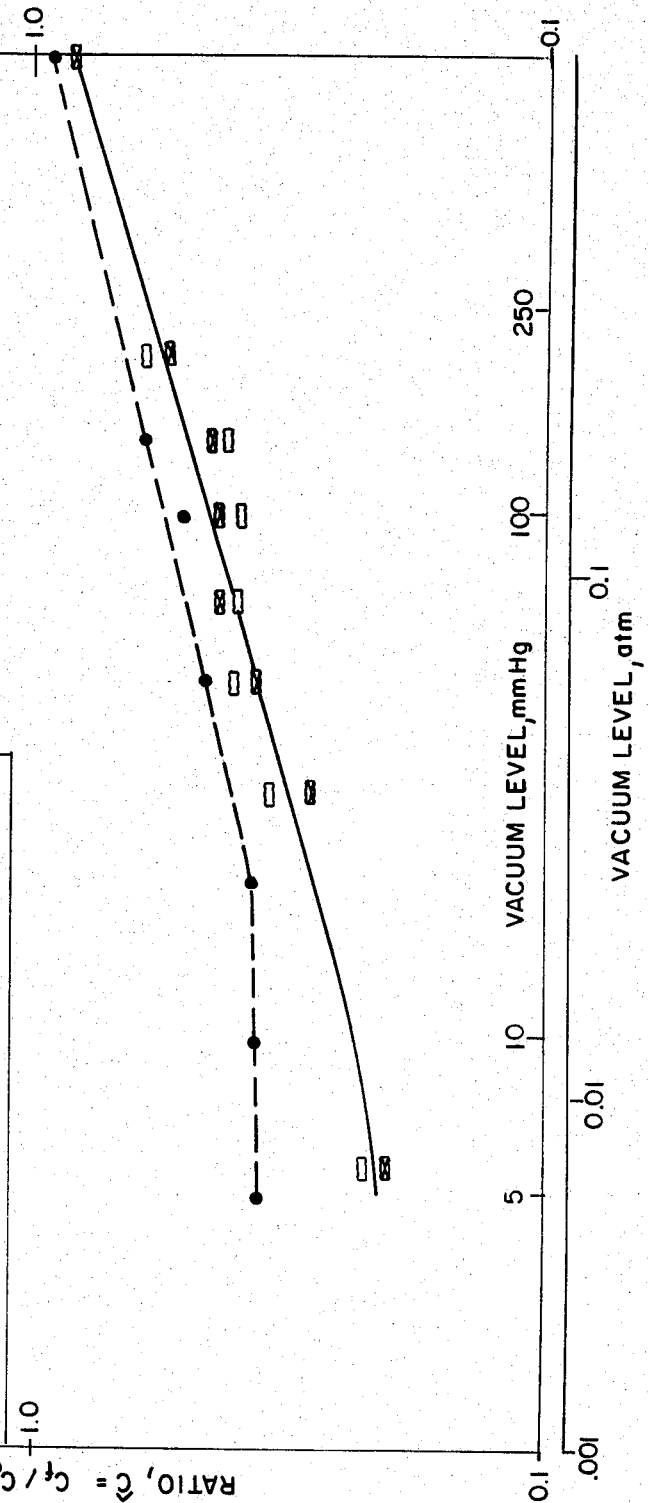

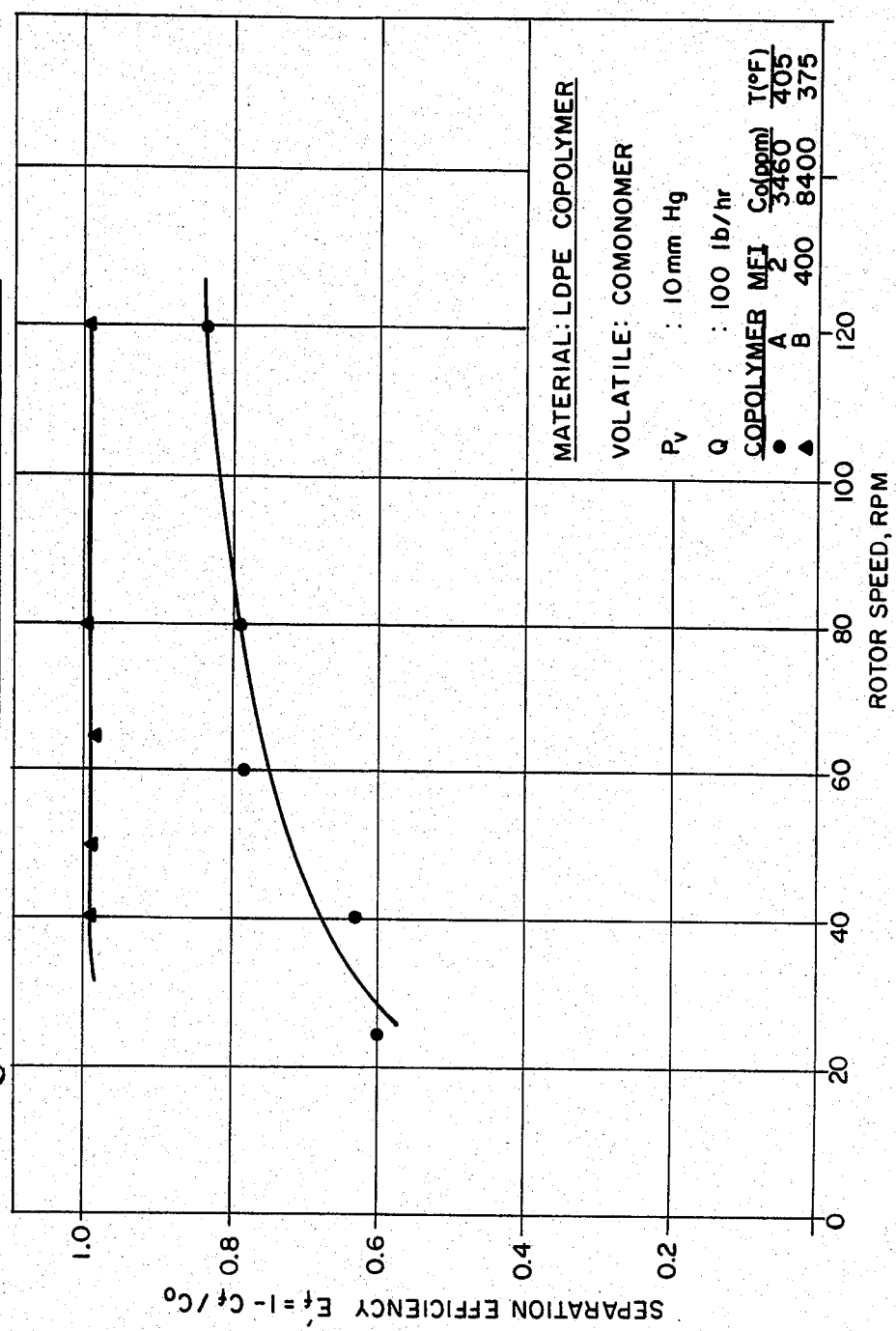

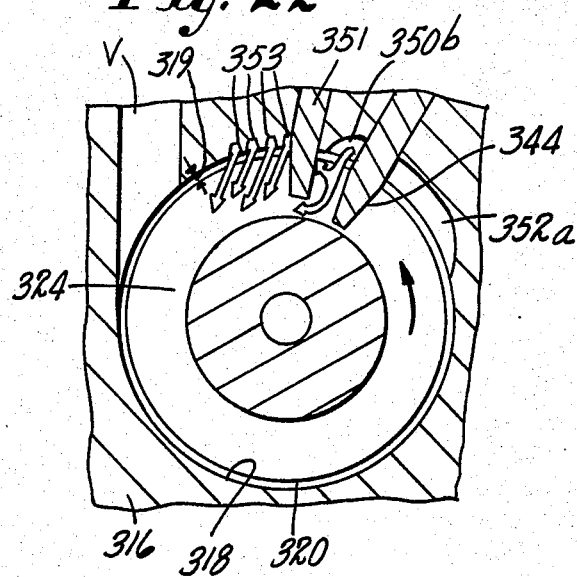
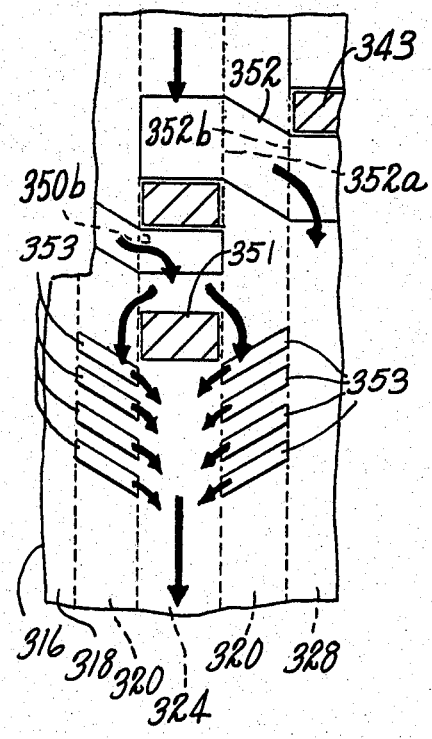
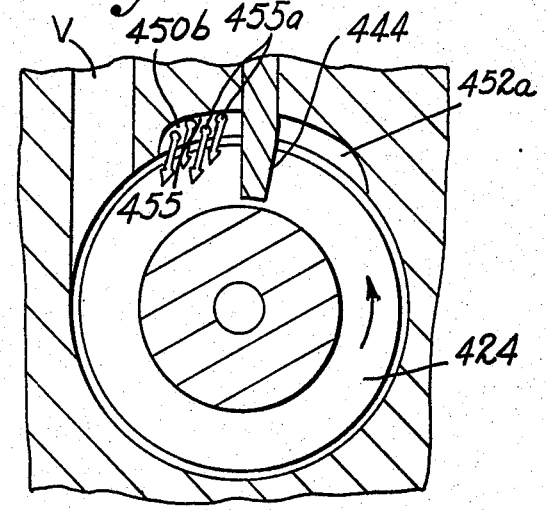

ROTARY PROCESSORS AND METHOD FOR DEVOLATILIZING MATERIALS

BACKGROUND OF THE INVENTION

1. The Field of the Invention

This invention relates to processing apparatus and methods. More precisely, this invention relates to rotary processors particularly useful for processing materials containing dispersed volatiles.

2. Description of the Prior Art

Rotary processors are known to the art. Details relating to such processors are described in U.S. Pat. Nos. 4,142,805; 4,194,841; 4,207,004; 4,213,709; 4,227,816; 4,255,059; 4,289,319; 4,300,842; 4,329,065; 4,389,119; 4,402,616; 4,411,532; 4,413,913 and 4,421,412.

Essential elements of the basic individual processing passage of rotary processors disclosed in the above patents comprise a rotatable element carrying at least one processing channel and a stationary element providing a coaxial closure surface operationally arranged to form with the channel an enclosed processing passage. The stationary element has an inlet for feeding material to the passage and an outlet for discharge of material from the passage. A member providing a material blocking and material collecting end wall surface is also associated with the stationary element and arranged near the outlet. The end wall surface is adapted to block movement of material fed to the passage and to coact with the moving channel walls to establish relative movement between the blocked material and the moving channel walls. This coaction permits material in contact with the moving walls to be dragged forward to the end wall surface for collection and/or controlled processing and/or discharge.

As disclosed in the above patents, the processing passages present a highly versatile processing capability. The passages are adaptable for performing such processing operations as melting, mixing, pressurizing, pumping, devolatilizing and homogenizing, among others, as well as adding ingredients to or withdrawing ingredients from materials processed in the passage.

U.S. Pat. Nos. 4,227,816; 4,213,709; 4,389,119; 4,402,616 and 4,411,532 relate to multi-stage rotary processors which include a plurality of processing stages, each having one or more processing passages. Material transfer passages or grooves are formed in the closure surface of the stationary element and arranged to transfer material from a passage (or passages) of one stage to a passage (or passages) of another stage.

U.S. Pat. Nos. 4,329,065 and 4,413,913 relate to apparatus and method, respectively, for devolatilizing materials. In accordance with the apparatus and method disclosed therein, material is fed to the processing passage and, near the inlet, the material is collected at a spreading element, builds up pressure and is spread as thin films on the sides of the rotating channel walls. A void space is provided downstream of the spreader and a vacuum source is connected to the void space so that volatile materials can be withdrawn from the surfaces of the thin films carried past the void space. The films may be respread on the channel walls at selected positions about the circumference of the passage to provide more than one void space where the renewed surfaces of the respread films can be exposed to vacuum. The thin films are carried forward through the passage toward the material collecting end wall surface where the films are scraped from the walls, collected and pressurized for discharge. Usually the material is discharged to another devolatilizing passage where it is again spread on the walls and exposed to vacuum in the manner described to achieve the desired degree of devolatilization.

Efficient removal of volatiles from materials is achieved by the method and apparatus disclosed in above referenced U.S. Pat. Nos. 4,329,065 and 4,413,913. The mass transfer mechanism utilized in the referenced patents primarily involves diffusion of volatiles from the film surfaces during exposure to vacuum or to the inert atmosphere in the void space. In turn, the rate of diffusion of volatiles from the film surfaces—or the volatiles mass transfer efficiency—is dependent on and influenced by such factors as the volatile diffusivity, film thickness, and time of exposure. Thin layers of low viscosity liquid materials provide particularly efficient mass transfer of volatiles from the surfaces of the layers. However, mass transfer efficiency decreases as the effective diffusivity of the material decreases, as is normally the case with high viscosity materials. Additionally, the difficulty of forming continuous thin films with highly viscoelastic materials at high speeds further limits the mass transfer efficiency. This reduced mass transfer efficiency with highly viscous, viscoelastic materials can result in larger equipment requirements to attain the desired degree of volatile removal at the high throughput rates required for commercial use.

This invention is directed to novel improved rotary processors and devolatilizing methods which provide special advantages in terms of increased devolatilizing efficiency, enhanced quality of product and particularly efficient overall processing performance characteristics.

BRIEF SUMMARY OF THE INVENTION

The novel rotary processors and devolatilizing methods of this invention involve a devolatilizing stage which comprises a rotatable element carrying at least two annular channels and a stationary element providing a coaxial closure surface operationally arranged with the channels to provide at least first and last enclosed devolatilizing passages. The first devolatilizing passage of the stage includes an inlet associated with the stationary element for receiving material to be processed in the stage. The last devolatilizing passage of the stage has an outlet associated with the stationary element for discharging processed material from the stage. Each devolatilizing passage of the stage includes a blocking member associated with the stationary element which provides an end wall surface for the passage. The blocking members are arranged and adapted so that material fed to the passages of the devolatilizing stage can be carried forward by the rotatable channel walls to the end wall surfaces where movement of the carried forward material is blocked and the blocked material is collected for discharge from the passages. One or more transfer grooves are formed in the closure surface of the stationary element and positioned near the end wall surface. These transfer grooves are arranged to interconnect adjacent devolatilizing passages so that material blocked and collected in one passage can be transferred to an adjacent devolatilizing passage. Additionally, the devolatilizing stage may include a vacuum source arranged and adapted for operational communication with the devolatilizing passages.

The novel rotary processors and devolatilizing methods of this invention involve improved devolatilizing stages which are designed to achieve devolatilization by way of a mechanism involving three steps: (1) nucleation of bubbles of volatile material within the processing material, (2) growth of the bubbles and (3) rupture of the bubbles. This mechanism does not require spreading of the material on the channel walls as thin layers, but nevertheless provides extremely efficient mass transfer of volatiles from processing materials including viscous, viscoelastic materials. Essentially, the mechanism is achieved by a distinctive integration of features including control of the processing volume available within the devolatilizing stage passages and control of the transfer volume available within the transfer grooves interconnecting passages of the stage. The integrated control of these features provides a devolatilizing stage arrangement which may be coordinated with the processing rate, the vacuum level and the characteristics of the material being processed. This coordination results in an especially efficient and dynamic foam devolatilization action in which material fed to each partially filled devolatilizing passage immediately undergoes significant expansion in volume and foaming because of extremely rapid bubble nucleation and growth at or very near the feed point. Some of these bubbles may be ruptured almost immediately on formation, and volatiles are released from the material and withdrawn by the vacuum.

Bubble nucleation, growth and rupture continues and withdrawal of flashed off volatiles continues as the material is carried forward through the passage in the form of a substantially continuous strand or as discontinuous chunks of material. The material is then collected at the end wall surface for discharge from the passage. In operation, the material is carried through each passage in a substantially plug-flow fashion; that is, as a direct result of the coordination described above, there is no significant internal shearing or pressurization of the material during its travel through the passage under vacuum. This plug-flow travel provides periods of time during which bubble nucleation and growth occur freely as volatile separation continues. Thus as the material is dragged forward, continued expansion and/or foaming of the processing material occurs. One or more shearing zones are provided within the devolatilizing stage where a shearing action is generated which promotes rupture of bubbles in the material. However, within the shearing zone(s) no significant increase in pressure within the material occurs and redissolution of the bubbles of volatiles into the material is effectively inhibited resulting in highly efficient foam devolatilization of materials, including highly viscous, viscoelastic materials.

Details relating to the novel rotary processors and devolatilization methods of this invention as well as the advantages derived from such processors and methods, will be more fully appreciated from the Detailed Description of the Preferred Embodiments taken in connection with the Drawings.

BRIEF DESCRIPTION OF THE DRAWINGS

The invention will be described in connection with the attached drawings in which:

FIG. 5a is a simplified cross-sectional view of a portion of a first devolatilizing passage of this invention substantially identical to the passage of FIG. 2, but showing alternate processing elements arranged in the passage;

FIG. 5b is a simplified schematic view of the passage of FIG. 5a, with larger arrows indicating the flow direction of material in the passage and smaller arrows indicating recirculation of material within non-pressurizing shearing zones;

FIG. 6a is a simplified cross-sectional view of a portion of a first devolatilizing passage of this invention substantially identical to the passage of FIGS. 2 and 5a, but showing an alternate processing element arranged in the passage;

FIG. 6b is a simplified cross-section of the passage of FIG. 6, further illustrating the alternate processing element of FIG. 6;

FIGS. 7-10 are graphical representations of data recorded during operation of a rotary processor of this invention.

FIG. 21 is a simplified schematic view of a portion of the closure surface enclosing the devolatilizing stage, illustrating an alternate arrangement of an inlet to the stage with arrows indicating the movement of material in the stage;

FIG. 22 is a simplified cross-sectional view of the closure surface of FIG. 21 enclosing a first devolatilizing passage, with larger arrows indicating the movement of material in the passage;

FIG. 23 is a simplified cross-sectional view of a first devolatilizing passage, illustrating an alternate arrangement of an inlet to the devolatilizing stage, with arrows indicating the movement of material in the stage.

DETAILED DESCRIPTION OF THE PREFERRED EMBODIMENTS

Figure 1:
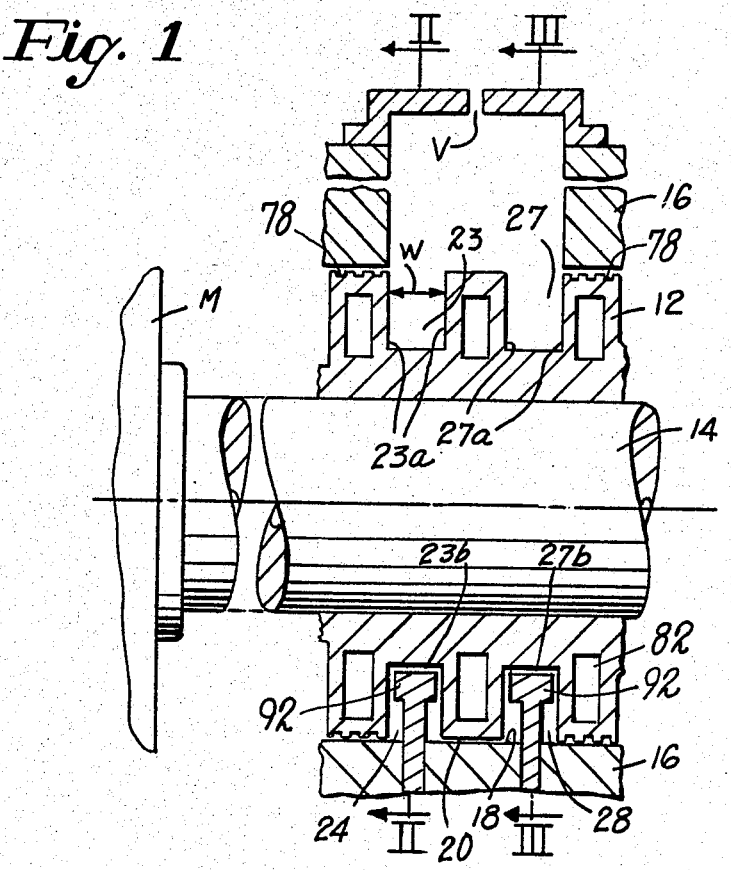
FIG. 1 is a simplified cross-sectional view of a rotary processor of the invention including a novel devolatilizing stage.

Referring first to FIG. 1, the novel devolatilizing stage of this invention includes a rotatable element comprising a rotor 12 mounted on a drive shaft 14 for rotation within a stationary element comprising a housing 16. Rotor 12 carries at least two annular devolatilizing channels 23 and 27, each having opposed side walls 23a and 27a respectively, extending inwardly from rotor surface 20 and each having a root surface 23b and 27b respectively, substantially parallel with the rotor surface. Means for rotating rotor 12 are designated M, since such means are of any suitable type commonly used for rotating extruders or similar apparatus for processing viscous or plasticated materials and are well known in the art. Housing 16 of the stationary element provides coaxial closure surface 18 cooperatively arranged with surface 20 of rotor 12 to form with channels 23 and 27 enclosed devolatilizing passages 24 and 28, the illustrative first and last devolatilizing passages, respectively, of the stage. The vacuum source for maintaining a vacuum within the devolatilizing stage is shown as V. Suitable sources include those of the type used for maintaining a vacuum in devolatilizing apparatus such as the devolatilizing sections of screw extruders and in rotary processors such as those described in above-referenced U.S. Pat. Nos. 4,329,065 and 4,413,913. Sealing means 78 (FIG. 1) are provided between surface 20 of rotor 12 and surface 18 of housing 16 at the axial periphery of the devolatilizing stage, to assist in maintaining the vacuum level in the stage. Preferred sealing means 78 are of the type described in commonly owned, co-pending U.S. patent applications Ser. Nos. 532,165 and 532,157, filed on the same day as this application by P. S. Mehta and by P. S. Mehta and L. N. Valsamis respectively, both incorporated herein by reference.

As will be explained in more detail below, passages 24 and 28 of the devolatilizing stage are interconnected by transfer groove 52 (FIG. 4) formed in closure surface 18 and arranged so that material processed in devolatilizing passage 24 can be transferred to passage 28. Since vaporization of the volatiles in the material tends to lower the temperature of the material, the devolatilizing efficiency of the processor may be increased by replacing heat lost by vaporization by providing heating means to heat at least the side walls of the devolatilizing channels, and preferably the housing of the processor as well. Temperature control means 82 illustrated in FIG. 1 is a series of chambers formed in the rotor through which heat transfer fluid may be circulated in a known manner, but any suitable means to control the temperature of the material during processing may be used. The complete devolatilizing stage illustrated in FIG. 1 shows two passages, but more than two passages may be provided, in which case the passages between the first and last passages are termed intermediate devolatilizing passages, and are arranged so that all adjacent devolatilizing passages of the stage are connected in an in-series relationship by transfer grooves.

Figure 2:
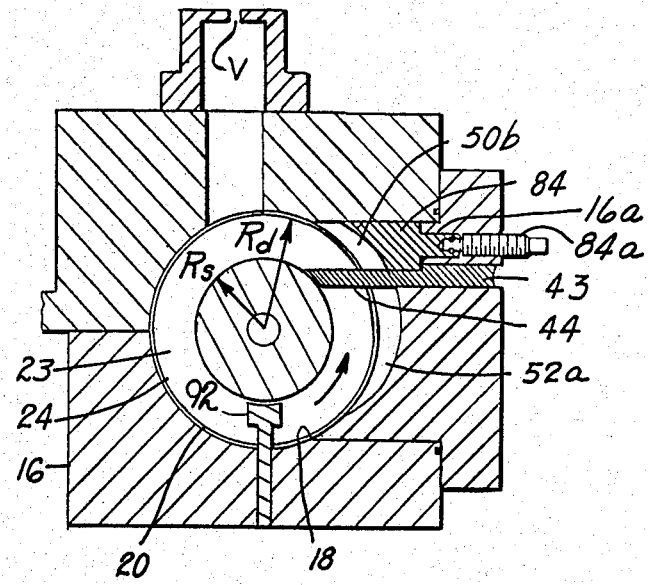
FIG. 2 is a simplified cross-sectional view of a first devolatilizing passage of the rotary processor of FIG. 1, taken along line II—II of FIG. 1.
Figure 3:
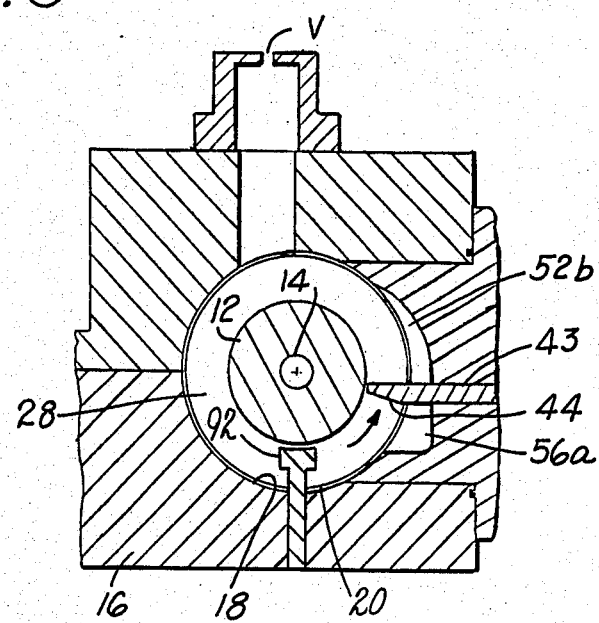
FIG. 3 is a simplified cross-sectional view of a last devolatilizing passage of the rotary processor of FIG. 1, taken along line III—III of FIG. 1.

FIGS. 2 and 3 illustrate the first and last devolatilizing passages respectively of the devolatilizing stage of FIG. 1, each communicating with vacuum means V. First devolatilizing passage 24 (FIG. 2) includes inlet 50b and outlet 52a, both formed in housing 16. Last devolatilizing passage 28 (FIG. 3) includes inlet 52b and outlet 56a also formed in housing 16. Outlets 52a and 56a are preferably spaced apart from the inlets a major portion of the circumferential distance about the devolatilizing passages. Each passage (FIGS. 2 and 3) includes end wall surface 44 provided by blocking member 43 (associated with housing 16) and arranged near the passage outlet (52a or 56a) to collect material processed in the passage for discharge from the passage. Inlet 50b of first devolatilizing passage 24 and outlet 56a of last devolatilizing passage 28 provide the inlet and outlet respectively of the devolatilizing stage.

Inlet 50b of passage 24 (FIG. 2) is relatively narrow in cross section, and generates pressure and temperature increases upstream of inlet 50b thus providing complete filling of inlet 50b and preventing vacuum leakage through inlet 50b. Further precise control of the temperature, pressure and vacuum sealing at inlet 50b during operation may be achieved by providing inlet control gate 84 at inlet 50b of the devolatilizing stage (FIG. 2). Control gate 84 extends radially into inlet 50b and may be designed to be adjustable from outside the processor to constrict inlet opening 50b to a preselected degree. Thus control gate 84 can provide inlet 50b with the capability for selectively adjusting the temperature and pressure at the inlet to the devolatilizing stage before and during operation. Control gate 84 passes through opening 16a in housing 16 and extends radially into inlet 50b to an extent which may be controlled in known manner by adjusting screw 84a, thus providing precise control of the pressure and temperature of material entering the devolatilizing stage. A similar control gate (not shown) may be provided to achieve precise control during operation of the outlet temperature pressure and vacuum sealing at outlet 56a (FIG. 3) of the stage. The preferred location and effects of an outlet control gate for the devolatilizing stage of this invention and its advantages are described in detail below for outlet control gate 288 (FIG. 13) and in above-referenced applications Ser. Nos. 532,165 and 532,157.

Figure 4:
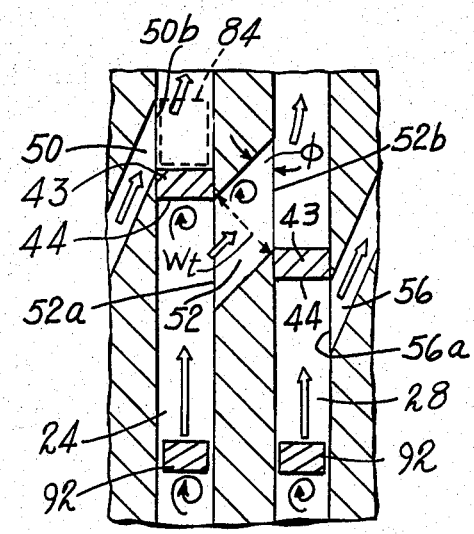
FIG. 4 is a simplified schematic view of the interconnection of the devolatilizing passages of the rotary processor of FIG. 1 by means of a transfer groove, with larger arrows indicating the flow direction of material from one passage to another and smaller arrows indicating recirculation of material within non-pressurizing shearing zones.

FIG. 4 illustrates schematically the movement of material in the devolatilizing stage. In FIG. 4, passages 24 and 28 are interconnected by intra-stage transfer groove 52 (formed in surface 18 of housing 16) which is arranged so that material processed in passage 24 can be transferred to passage 28 for further devolatilizing. Transfer groove 52 provides outlet 52a for passage 24 and inlet 52b for passage 28.

In the preferred embodiment shown in FIG. 4, transfer groove 50 interconnects passage 24 and an upstream passage or stage (not shown) of the processor, and provides inlet 50b for feeding material to the devolatilizing stage. Also in the preferred embodiment shown in FIG. 4, transfer groove 56 interconnects passage 28 and a downstream passage or stage (not shown) of the processor, and provides outlet 56a for discharging material from the devolatilizing stage. However, other forms of inlet and/or outlet arrangements for the stage may be used, such as gravitational or forced feeding directly to the devolatilizing stage from outside the processor, or directly discharging material from the stage to outside the processor through outlet 56a of the devolatilizing stage. (Transfer grooves 50 and 56 for feeding to and discharging material from the devolatilizing stage are also formed in surface 18 of housing 16.)

The novel devolatilizing stage of this invention is characterized by features which permit efficient devolatilization of viscous—including viscoelastic—materials. The devolatilizing stage provides a spatial geometrical arrangement yielding integrated control of (1) the processing volume available within the devolatilizing passages of the stage, (the processing volume capacities) e.g. within passages 24 and 28 of the illustrative processor, and (2) control of the transfer volume available within the transfer grooves interconnecting adjacent devolatilizing passages within the stage (the transfer volume capacities) e.g. within transfer groove 52 of the illustrative processor. The integrated control of these features and capacities provides a devolatilizing stage arrangement which may be coordinated with the volumetric processing rate and the vacuum level, and with the characteristics of the material being processed to provide effective separation of volatiles from material processed in the devolatilizing stage by fully exploiting the foam devolatilization mechanism described below.

The foam devolatization mechanism achieved in the devolatilization stage of this invention involves three steps: nucleation of bubbles containing the volatiles, growth of the bubbles, and rupture of the bubbles. Material fed to the devolatilization stage at a temperature and pressure controlled by the cross-sectional size of inlet 50b and by control gate 84 is suddenly exposed to a pressure level below the vapor pressure of the volatiles in the material, producing an unstable, superheated mixture of the viscous material and the volatiles carried therein. In order to reestablish thermodynamic equilibrium with the pressure in the passage space above or around the material, spontaneous evaporation of the volatiles takes place, forming bubbles of volatiles within the material. In viscous materials, the formation of bubbles of volatiles results in foaming of the material, the stability of the foam depending on the rheological properties of the material being processed. The formation of these bubbles within the material provides a dramatic increase in surface area across which volatile components may pass by diffusion, and in accessibility of this surface area to the volatiles. Mass transfer across this surface area may be increased by providing a period of time during which the material under vacuum undergoes neither significant increase in pressure nor significant shearing, allowing free bubble growth and continued bubble nucleation as separation of volatiles continues. During this time, some of the bubbles closest to the surface may rupture spontaneously. But, for higher viscosity materials, movement of bubbles through the material to the exposed surface for rupture and release of volatiles is hindered, and shearing must be induced within the material at one or more points within the devolatilizing stage to facilitate surface renewal and bubble rupture. Also, volatiles released by bubble rupture are continuously removed from the passage so that a low pressure level is maintained to promote continued growth of bubbles and to prevent redissolution of volatiles into the material.

In the novel devolatilizing stage of this invention, the devolatilizing passages and the transfer groove(s) interconnecting these passages are arranged to provide space for unrestricted foaming of the material processed in the stage. "Space for unrestricted foaming" means that the geometry of the passages and of the transfer groove(s) interconnecting them provide a partially filled expansion chamber of sufficiently large capacity for substantially unrestricted bubble nucleation and growth to take place without any substantial increase of pressure within the material processed in the stage. Further, except at specific shearing zones (described below), the design of the devolatilizing stage permits the material to be carried through each partially filled devolatilizing passage in a substantially plug-flow fashion, providing periods of time during which the material under vacuum is substantially undisturbed with no significant shearing or pressurization induced so that mass transfer of the volatiles is significantly increased.

Another feature of the novel devolatilizing stage of this invention provides one or more non-pressurizing shearing zones within the stage for inducing a high degree of shear within the material to promote surface renewal and bubble rupture for the release of the volatiles. Most importantly, the various portions of the devolatilizing stage providing these shearing zones are specifically arranged to induce this shearing without causing any significant increase in pressure, so that redissolution of volatiles into the material due to repressurization is minimized. These features result in highly efficient devolatilization of materials, including highly viscous, viscoelastic materials which, in the past, have been difficult to devolatilize.

The interrelationship of the control of the processing volume available within the devolatilizing passages and the control of the transfer volume available within the transfer groove(s) with the volumetric processing rate is the critical feature which provides the non-pressurizing shearing zones within the stage. Passage 24 shown in FIGS. 1, 2 and 4 has a processing volume capacity which provides space for unrestricted foaming of material processed in the passage. As shown in FIG. 4, end wall 44 of passage 24 is arranged to collect the foamed material for discharge from passage 24 through outlet 52a and for transfer to last devolatilizing passage 28 through transfer groove 52. Transfer groove 52 provides a transfer volume capacity which is greater than the expanded volume of the foamed material being transferred. Therefore material enters and passes through partially filled transfer groove 52 without developing any significant increase in pressure within transfer groove 52. Accordingly, the pressure generated upstream of non-pressurizing transfer groove 52 within the material collected at end wall 44 is not significantly greater than that required to discharge the material from passage 24. The coordination of the transfer volume capacity of non-pressurizing transfer groove 52 with the volumetric processing rate and with other processing variables mentioned above, provides a non-pressurizing shearing zone upstream of transfer groove 52 at end wall 44 of passage 24 in which a relatively small, rapidly recirculating pool of material is collected, generating high shear and constant surface renewal. Thus the bubbles of volatiles within the material are ruptured breaking down the foam and releasing the volatiles into the passage to be removed through vacuum means V. This collection, bubble rupture and transfer of the material takes place with minimal increase in pressure within the pool, thus minimizing redissolution of volatiles from the bubbles into the material.

Non-pressurizing transfer groove 52 also provides a non-pressurizing shearing zone. The transfer volume capacity of transfer groove 52 is sufficient to allow rapid rotation of material within transfer groove 52 as rotor surface 20 rotates past the groove, causing further breakdown of the foam due to surface renewal and bubble rupture during transfer. The volatiles released by the rupture of the bubbles within transfer groove 52 pass through the transfer groove and the devolatilizing passages and are withdrawn through vacuum means V. An additional advantage is provided by the minimal increase in pressure in the non-pressurizing shearing zones. Bubbles of volatiles can continue to nucleate and grow during the rapid rotation of the material in each of the non-pressurizing shearing zones, further increasing the mass transfer efficiency. Further, an increase in the number of bubbles (and surface area) can take place as the shearing causes division of the bubbles.

Non-pressurizing shearing zones in addition to those within transfer groove 52 and at end wall 44 may be provided by the introduction into one or more devolatilizing channels of one or more non-pressurizing shearing elements. One type of shearing element, 92, is positioned in passage 24, as illustrated in FIGS. 1, 2 and 4. Shearing element 92 is rectangular in cross-section and is positioned to obstruct the smooth flow of the foamed material at channel root 23b (FIG. 1) of passage 24 causing a small rapidly recirculating pool of material to collect upstream of shearing element 92, as indicated by a small arrow in FIG. 4, until the pool is large enough to spill over shearing element 92 and continue its flow toward end wall 44. The geometry of shearing element 92 is coordinated with the geometry of the devolatilizing passage and with the volumetric flow rate and rotor speed so that the cross-sectional area available for flow of the foamed material past shearing element 92 is greater than that actually occupied by the material. Thus shear is generated within the material for bubble rupture with no significant increase in pressure within the material so that redissolution of volatiles into the material is minimal. Another shearing element 92 is positioned in devolatilizing passage 28 (channel 27) to provide an additional non-pressurizing shearing zone in that passage (FIGS. 1, 3 and 4).

FIGS. 1-4 show a single shearing element in each passage, but more than one shearing element may be introduced into each passage, and alternate geometries are possible. For example, FIGS. 5a and 5b illustrate three non-pressurizing shearing elements 94a, 94b and 94c extending radially into passage 24 to obstruct the smooth flow of foamed material at alternating sides of the channel, causing a rapidly recirculating pool of material to collect upstream of each shearing element (indicated by the smaller arrows in FIG. 5b), generating shear for bubble rupture and release of the volatiles. As more material is carried into each shearing zone, some of the material leaves the zone to be carried to the next shearing zone; e.g. material collected and sheared upstream of element 94a is directed toward the opposite side of the channel, carried past element 94a and is collected upstream of element 94b for further shearing, and so on, until the material flows toward and is collected at the non-pressurizing shearing zone at end wall 44, described above. The geometries of shearing elements 94a, 94b and 94c are also designed to provide a cross-sectional area available for the flow of material past each element greater than that occupied by the material, so that shear is generated without significant increase of pressure within the material.

Another form of non-pressurizing shearing element is illustrated in FIGS. 6a and 6b. Shearing element 96 extends radially into channel 23 and is shaped to conform closely to the cross-sectional shape of the channel. Circumferential grooves 96a are formed in the portions of element 96 adjacent the side walls 23a of the channel. The sum of the cross-sectional areas of these grooves is designed to be greater than the area actually occupied by the material flowing past element 96. Thus, material is collected upstream of element 96 as a rapidly recirculating pool, generating shear within the material. As more material enters this shearing zone, some of the material is carried by rotating channel walls 23a through grooves 96a past element 96. Because of the cross-sectional area available for flow of the material past element 96, effective shearing may be induced with no significant increase in pressure within the material.

The introduction into the devolatilizing stage of the additional non-pressurizing shearing zones provided by the non-pressurizing shearing elements described above can result in highly efficient devolatilization of certain materials. These elements are especially effective when processing viscous, viscoelastic materials which form highly stable foams requiring a high shear rate for effective foam breakdown.

In operation, the volatile-containing material enters the devolatilizing stage at a controlled rate and at a temperature and pressure level determined by the cross-sectional size of inlet 50b of the stage which may be precisely controlled by control gate 84 (FIGS. 2 and 4). Normally the material is fed to the devolatilizing stage and dragged through the stage in the form of a substantially continuous strand. However, in the case of materials of lower elasticity being processed at high speeds of rotation a continuous strand may not be formed. Rather, discontinuous "chunks" of material may be formed as the rapidly rotating channel surfaces drag portions of the material away from the inlet, breaking the strand. As the material enters passage 24 of the stage, the heated, pressurized material encounters a sudden decrease in pressure, and undergoes rapid expansion in volume as the volatiles contained in the now superheated material vaporize, nucleating bubbles throughout the volume of material. Because first devolatilizing passage 24 provides a processing volume capacity greater than the expanded volume of the foamed material, this bubble nucleation and growth is substantially unrestricted and remains substantially unrestricted as the material under vacuum is carried forward in a substantially plug-flow fashion. Thus, efficient bubble nucleation and growth can continue to occur as the foamed material is carried toward end wall surface 44 for collection, shearing and discharge from passage 24 through outlet 52a. The coordination of the volume of material entering the passage (the volumetric processing rate) and the processing volume capacity of the passage with other processing variables, described above permits the foamed material to occupy a volume which is less than the volume capacity of passage 24, so that the material undergoes no substantial increase in pressure as it is carried forward through the passage but instead is free to foam to the maximum degree in response to the temperature and vacuum level in the passage.

In the preferred operation, the flow of the foamed material is obstructed at non-pressurizing shearing element 92, so that as more material approaches shearing element 92 a recirculating pool of material is formed upstream of element 92. This recirculation induces shear within the material to promote efficient surface renewal and bubble rupture but results in no significant increase in pressure within the material. As more material is carried toward shearing element 92, the material spills over shearing element 92 and is again carried in plug-flow fashion toward end wall 44.

At end wall 44, the foamed material is collected as a rapidly recirculating pool of material, generating a high degree of shear within the material for surface renewal and bubble rupture. The material is discharged from passage 24 through outlet 52a and is transferred to last devolatilizing passage 28 through transfer groove 52. As mentioned, transfer groove 52 (FIG. 4) provides a transfer volume capacity which is greater than the expanded volume of the foamed material being transferred from passage 24 to next adjacent devolatilizing passage 28, (FIGS. 1 and 4). Therefore, there is no significant increase in pressure within transfer groove 52 as material is transferred from passage 24 to passage 28. Accordingly, the pressure generated upstream of non-pressurizing transfer groove 52 within the recirculating pool of material at end wall 44 is not significantly greater than that required to discharge the material from passage 24. Additionally, non-pressurizing transfer groove 52 provides a transfer volume capacity sufficient to allow rapid rotation of the material within transfer groove 52 as rotor surface 20 rotates past the groove, inducing shear and causing further breakdown of the foam during transfer with minimal increase in pressure within transfer groove 52.

This cycle of exposure of the material to vacuum for unrestricted bubble nucleation and growth during its plug-like travel through the devolatilizing passage, non-pressurizing shearing and surface renewal for bubble rupture and release of volatiles at the shearing zones, and transfer of the material to the next adjacent devolatilizing passage by way of a non-pressurizing transfer groove which provides an additional shearing zone continues through the intermediate devolatilizing passages (described above), if any, until the material enters last devolatilizing passage 28 through inlet 52b (FIGS. 3 and 4).

In passage 28, the material is carried forward by the rotation of rotor 12, sheared for bubble rupture at non-pressurizing shearing element 92 and approaches end wall surface 44 of last devolatilizing passage 28 for collection and discharge from the devolatilizing stage through transfer groove 56 (FIG. 4), which provides outlet 56a from the stage. Transfer groove 56 is not a non-pressurizing transfer groove. Thus the pressure at which material is discharged from the devolatilizing stage is determined in part by the cross-sectional size of outlet 56a and may be precisely controlled by a control gate (not shown) positioned at the inlet of the next downstream passage (not shown) in a manner similar to that described above for control gate 84 (FIG. 2) and in above-referenced applications Ser. Nos. 532,165 and 532,157. Accordingly, outlet 56a remains substantially completely full of material during operation to provide a material barrier which acts as a vacuum seal at the outlet of the devolatilizing stage, in a manner similar to that described for inlet 50b. Also, as is described in detail in applications Ser. No. 532,165 and 532,157, the outlet control gate may be used to precisely control the size of the recirculating pool of material at end wall 44 of passage 28.

Since outlet 56a is substantially full of material during operation, pressure is generated within the recirculating pool of material collected at end wall surface 44 of last devolatilizing passage 28, inducing further breakdown of any bubbles remaining in the material by redissolution of any remaining volatiles into the material. The pressure generated also assists in the discharge of the material from the devolatilizing stage through the relatively narrow opening of outlet 56a.

The distinctive advantages of a devolatilizing stage of this invention may be better understood by referring to the following examples. Tests were run comparing the efficiency of a processor with pressurizing transfer grooves and with non-pressurizing transfer grooves, under various processing conditions and treating various materials in the processor. Among the materials processed were:

| MATERIAL PROCESSED | VOLATILE(S) REMOVED |
|---|---|
| polystyrene | styrene, ethylbenzene |
| styrene-acrylonitrile (SAN) copolymer | styrene, acrylonitrile |
| low density polyethylene (LDPE) copolymers | comonomers |

Parameters describing the tested operating range of the processor are as follows:

| Processor: | flow rate: | 50–200 lb/hr |
| | rotor speed: | 20–200 RPM |
| | vacuum level: | 1–760 mm Hg |
| | processing temperature: | 350–550° F. |
| Feed: | material temperature: | 350–550° |
| | volatile concentration: | 40 ppm - 10% |
| | Viscosity (at feed temperature): | 1–400 MFI |
| Product: | material temperature: | 350–550° F. |
| | volatile concentration: | 10 ppm - 1% |
| | viscosity (at exit temperature): | 1–400 MFI |

The tested materials were observed to expand under vacuum in the devolatilizing stage from 1–5 times their feed volume. The materials, parameter ranges and processor dimensions listed above and in the Examples are intended to be illustrative of the efficiency obtainable with one embodiment of the present invention, and should not be regarded as limiting. Results of these tests are described in Examples 1–4, below, and are plotted in FIGS. 7–10.

EXAMPLE 1

A rotary processor of the type described above was used to process polystyrene containing styrene and ethylbenzene as impurities at initial volatile concentrations, $C_o$, of 2612 ppm, 2673 ppm and 3217 ppm. The processor included a rotor having a radius $R_d$ (as in FIG. 2) of 3.75 in. and carrying a single devolatilizing stage of five devolatilizing channels each having a width W (as in FIG. 1) of 0.6875 in. and a pumping stage of one channel having a width W of 0.25 in. The channel root radius $R_s$ (as in FIG. 2) of the devolatilizing channels was 2.125 in.; that of the pumping channel was 2.625 in. The feed rate was controlled by an extruder which force-fed the material to the inlet of the devolatilizing stage at 100 lb/hr. The temperature of the material was maintained at 450° F. A vacuum means was used to withdraw volatiles from the devolatilizing stage and to maintain a vacuum $P_v$ within the stage of 5-12 mm Hg.

The initial series of tests was run with narrow, pressurizing transfer grooves substituted for the non-pressurizing transfer grooves of this invention. Thus, the material was allowed to foam, but pressure was induced at each end wall and within the transfer grooves, resulting in at least partial redissolution of the separated volatiles at several points within the devolatilizing stage and lowering the efficiency of the stage as illustrated in FIG. 7. The transfer grooves within the devolatilizing stage had an average Radial Height of 0.75 in and an average Groove Width $W_t$ (as in FIG. 4)=0.6875 in.; the angle $\phi$ (as in FIG. 4) was 30°. The separation efficiency, $E'_f$ ($=1-C_f/C_{oi}$, where $C_f$ is the final volatile concentration and $C_o$ is the initial volatile concentration) at various speed of rotations is plotted as a broken line in FIG. 7.

The processor was then altered to provide non-pressurizing transfer grooves within the devolatilizing stage according to this invention. The dimensions of the devolatilizing passages remain unchanged. Tests were run with non-pressurizing transfer grooves of $W_t=1.8125$ in., 1.875 in., 1.625 in. and 1.5 in. respectively. The average Radial Height of the grooves was 0.675 in., then was changed to 0.9375 in. providing transfer grooves of approximately double the cross-sectional area or greater. When the Radial Height was 0.9375 in., non-pressurizing shearing elements (described above) were inserted into the first four devolatilizing channels. The angle of the transfer grooves, $\phi$, was again 30°. The initial volatile concentration was 2352 ppm when using the transfer grooves of 0.675 in. radial height, and 2322 ppm with those of 0.9375 in. The separation efficiency, $E'_f$, at various speeds of rotation is plotted as a solid line in FIG. 7.

EXAMPLE 2

The processor described above for Example 1 was used to determine the effect on separation efficiency of varying the vacuum level at a constant rotor speed of 60 RPM. Polystyrene (as in Example 1) having an initial volatile concentration of 3217 ppm was processed using the pressurizing transfer grooves described in Example 1. When using the shallower (radial height=0.675 in.) non-pressurizing transfer grooves, $C_o$ of the material was 2352 ppm; when using the deeper grooves (0.9375 in.) with non-pressurizing shearing elements, $C_o$ was 2322 ppm. Both types of non-pressurizing transfer grooves are described in Example 1. The vacuum level in the devolatilizing stage was varied from about 5-760 mm Hg. All other conditions were the same as those described for Example 1. The separation efficiencies, expressed in terms of a dimensionless concentration ratios $\hat{C}=C_f/C_o$ (final concentration/initial concentration of volatiles) are plotted in FIG. 8.

As may be seen in FIGS. 7 and 8, despite the lower initial starting concentration, the separation efficiencies at various vacuum levels and rotor speeds were greatly improved by providing the non-pressurizing transfer grooves of this invention, thus providing shearing zones within the devolatilizing stage which induce bubble rupture and release of the volatiles with no significant increase in pressure. The improvement is especially dramatic at the lower rotor speeds and vacuum levels tested. As may be seen in FIG. 7, the separation efficiency using pressurizing transfer grooves is very low at low rotor speeds, about 0.37 at 25 RPM, and approaches a maximum of 0.7 at 150 RPM. By altering the processor to provide the non-pressurizing transfer grooves of this invention, separation efficiency is greatly improved, remaining nearly constant at about 0.75 at all rotor speeds tested. This improvement can be especially significant when devolatilizing shear sensitive materials, which can now be devolatilized at lower rotor speeds. Additionally, for many other materials, lowering the rotor speed can significantly decrease power consumption with no significant effect on devolatilizing efficiency. In FIG. 8, $\hat{C}$ approaches a constant minimum of about 0.4 ($E'_f$=about 0.6) at low vacuum levels when using pressurizing transfer grooves. The use of non-pressurizing grooves significantly lowers $\hat{C}$, reaching about 0.24 ($E'_f$=about 0.76) at 6 mm Hg pressure. Further, $\hat{C}$ does not show a constant minimum at the same low vacuum levels, indicating that lower final concentrations of volatiles may be achieved if desired.

EXAMPLE 3

The effect of the viscosity of the material fed to the processor on separation efficiencies at various rotor speeds was tested using the processor of Example 1 with the non-pressurizing transfer grooves to remove comonomer from LDPE copolymer. Two similar samples were processed, Sample A having a viscosity of 2MFI ($C_o$=3460 ppm) and Sample B having a viscosity of 400 MFI ($C_o$=8400 ppm). As shown in FIG. 9, the separation efficiency, $E'_f$, is about 0.99 for the lower viscosity copolymer B, and ranges from 0.60 to 0.83 for the higher viscosity copolymer A. The relatively high separation efficiency for the high viscosity copolymer, especially at higher rotor speeds, was achieved in spite of a lower initial volatile concentration. Thus, as may be seen in FIG. 9, highly efficient volatile removal is obtainable for both high and low viscosity materials using the processor of this invention.

EXAMPLE 4

Figure 10:
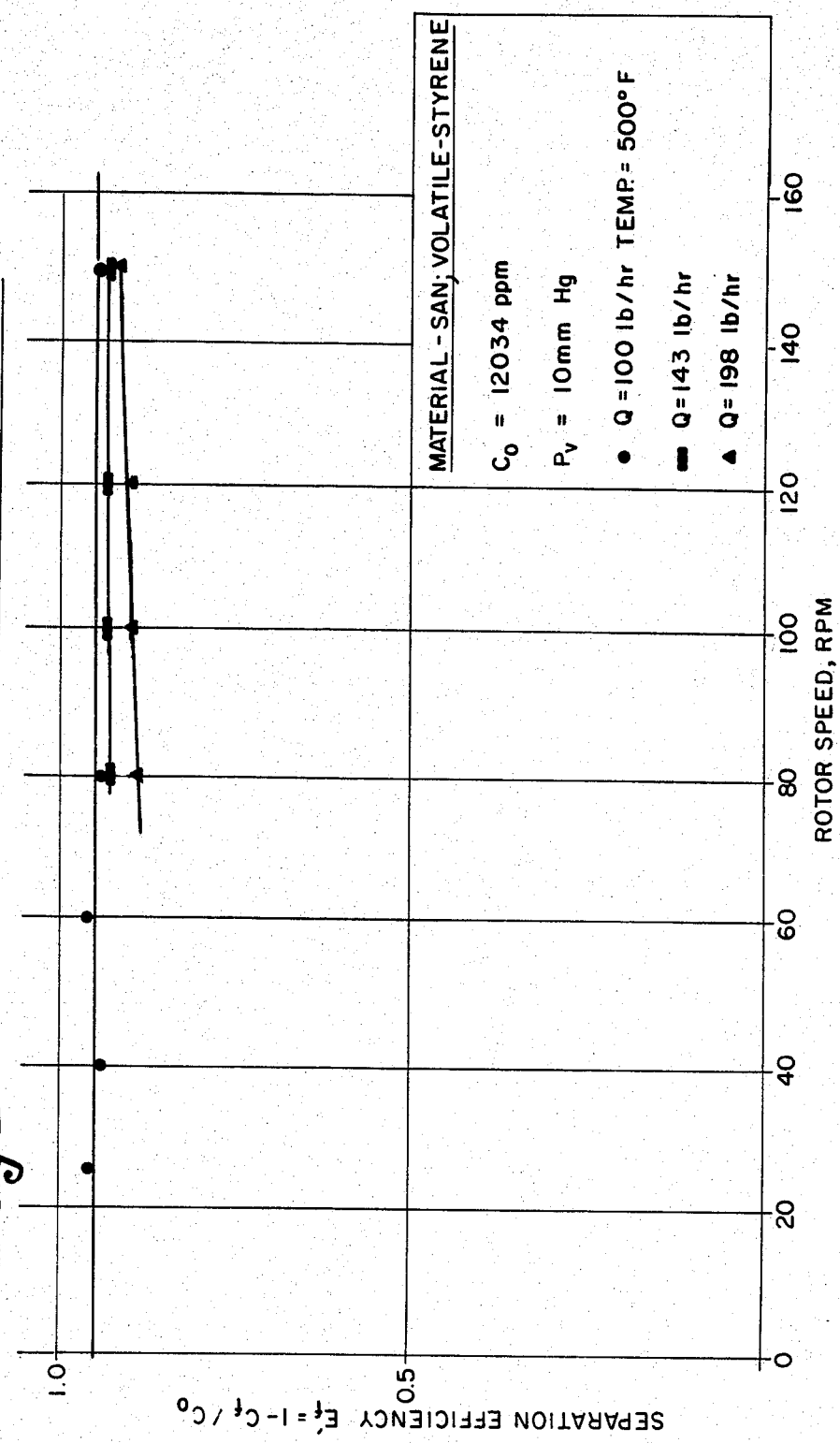

FIG. 10 illustrates the effect on separation efficiency, $E'_f$, of varying the processing rate of SAN copolymer in the processor of Example 1 using non-pressurizing transfer grooves. Very little change in efficiency may be noted for processing rates of 100, 143 and 198 lb/hr. Thus, the processor of this invention may be used to process materials within a wide range of processing rates, provided the volumetric processing rate of the foamed material being transferred through the transfer grooves is less than the transfer volume capacity of the grooves.

The above Examples and FIGS. 7-10 clearly demonstrate the versatility and efficiency of the rotary processors of this invention.

Figure 11:
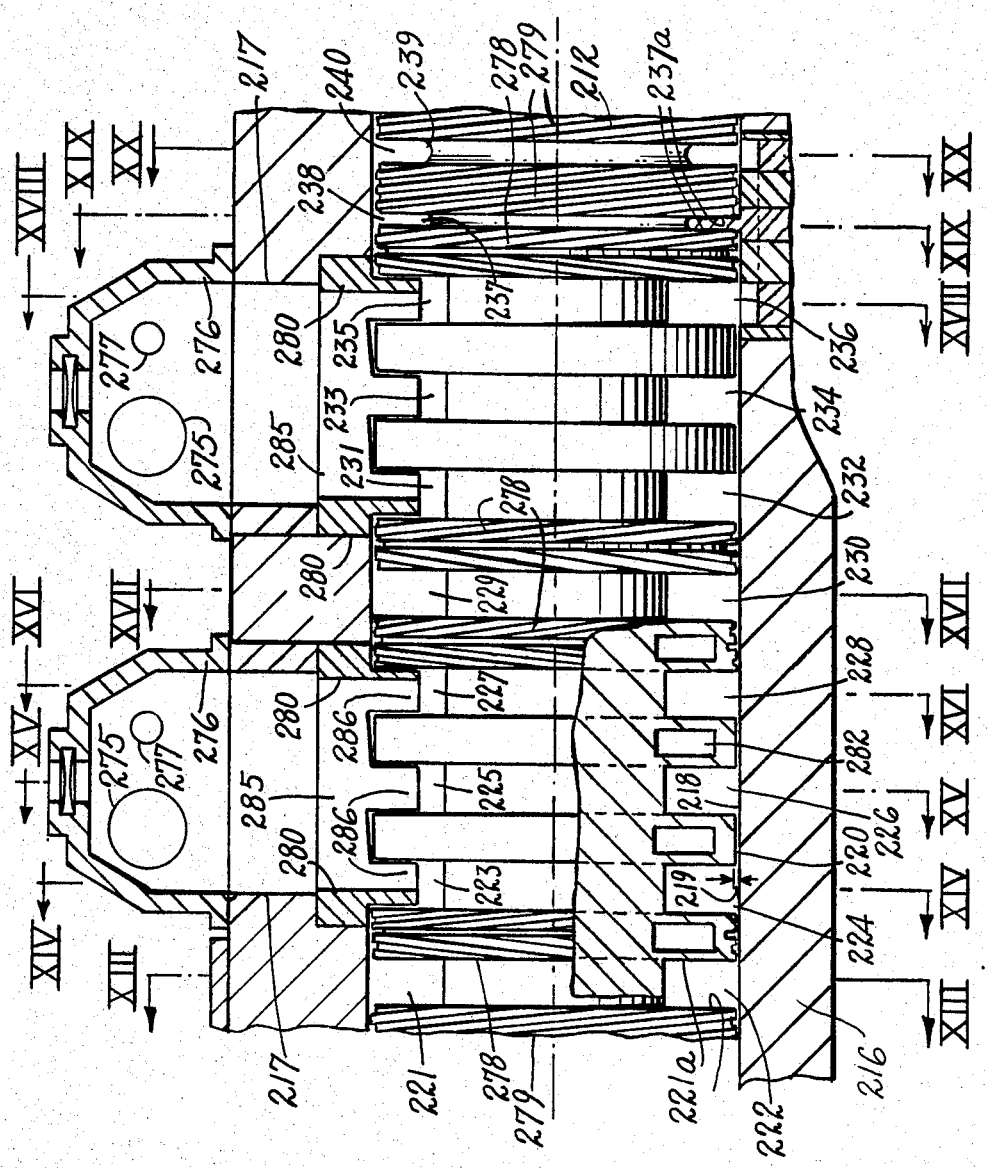
FIG. 11 is a simplified cross-sectional view of a multistage rotary processor of the invention showing an arrangement of processing passages providing a feed stage, novel devolatilizing stages, a mixing stage, a homogenizing stage and a pumping stage.

FIGS. 11-20 illustrate an especially preferred multi-stage rotary processor including the novel improved devolatilizing stage of this invention. As shown in FIG. 11, rotor 212 carries a plurality of angular channels enclosed by closure surface 218 of housing 216 to form passages which are arranged to provide several stages within the processor for performing various processing functions. Processing passage 222, formed with channel 221, provides the feed stage which is arranged to receive liquid material fed to the processor. Devolatilizing passages 224, 226 and 228, formed with channels 223, 225 and 227 respectively, provide the first devolatilizing stage. Devolatilizing passages 232, 234 and 236 formed with channels 231, 233 and 235, provide the second devolatilizing stage. Passage 230 (channel 229) provides a mixing stage separating the devolatilizing stages. Passage 238 (channel 237) provides a pumping stage; while passage 240 (channel 239), outboard of passage 238, provides a homogenizing stage.

Figure 12:
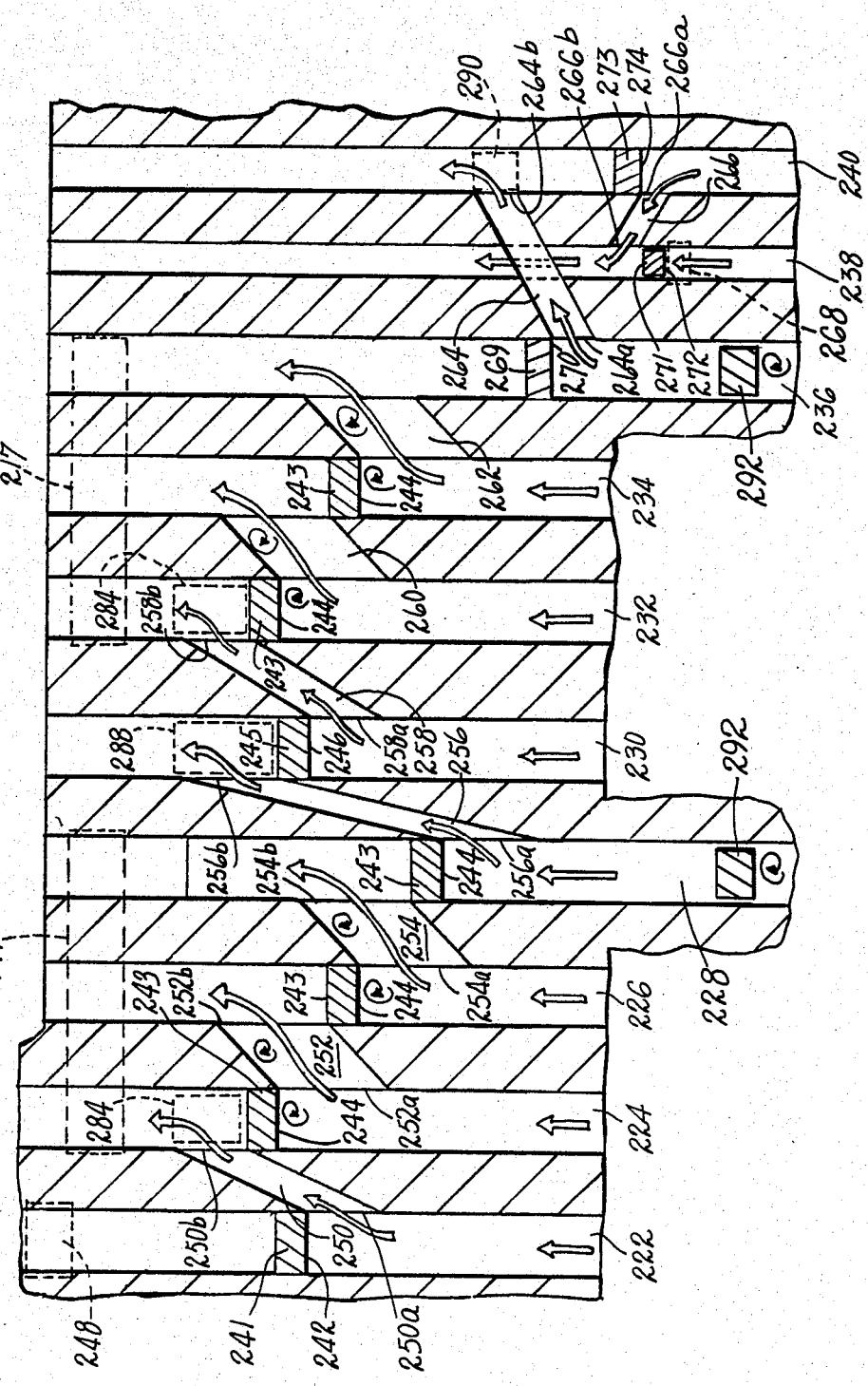
FIG. 12 is a simplified schematic view of the interconnection of the passages of FIG. 11 by means of transfer grooves, with larger arrows indicating the flow direction of material from one passage to another and smaller arrows indicating recirculation of material within non-pressurizing shearing zones.

As illustrated schematically in FIG. 12, the passages are interconnected by material transfer grooves (formed in surface 218 of housing 216) arranged so that material processed in one passage can be transferred to another passage for further processing. The transfer grooves and the inlets and outlets associated therewith may be formed directly in the closure surface. Alternatively they, as well as the blocking members described below, may be provided by one or more removable transfer plates associated with housing 216, as described in commonly owned U.S. Pat. No. 4,227,816.

In the processor illustrated in FIG. 11, the first devolatilizing stage communicates with vacuum manifold 276 through opening 217 through housing 216. Opening 217 extends over adjacent devolatilizing passages 224, 226 and 228. The preferred positioning of vacuum manifold 276 about the circumference of the passages is most clearly shown in FIGS. 12, 14, 15 and 16. Vacuum manifold 276 also communicates with a vacuum source (not shown) through opening 275 to evacuate the passages of the devolatilizing stage. Manifold 276 may also communicate with a vacuum measurement means (not shown) through opening 277. A second vacuum manifold 276 also communicates in a similar manner with the second devolatilizing stage as illustrated in FIGS. 11 and 12. The vacuum manifolds illustrated in FIGS. 11, 12, 14, 15 and 16 are preferably of the type described in commonly owned, copending U.S. application Ser. No. 532,156, filed on the same day as this application by P. S. Mehta et al. The devolatilizing stages may be at the same or different vacuum levels.

As shown in FIG. 11, surface 220 of rotor 212 is spaced apart from surface 218 of housing 216 by close clearance 219. This close clearance, however, is not by itself normally sufficient to prevent vacuum leakage in the devolatilizing stages. Accordingly, rotor surfaces 220 between channels of differing pressure levels are provided with sealing means, such as vacuum seals 278, shown in FIG. 11 between channels 221, and 223, 227 and 229, 229 and 231, and between channels 235 and 237. Vacuum seals 278 are described in detail in above-referenced U.S. applications Ser. Nos. 532,156 and 532,157. Additionally, seals 279 (FIG. 11) are provided at the ends of the rotor and between channels 237 and 239 to control leakage of liquid material over rotor surface 220. These seals are more fully described in above-referenced U.S. Pat. No. 4,300,842. Sealing is not shown between channels within each devolatilizing stage, but could be provided if desired.

Figure 13:
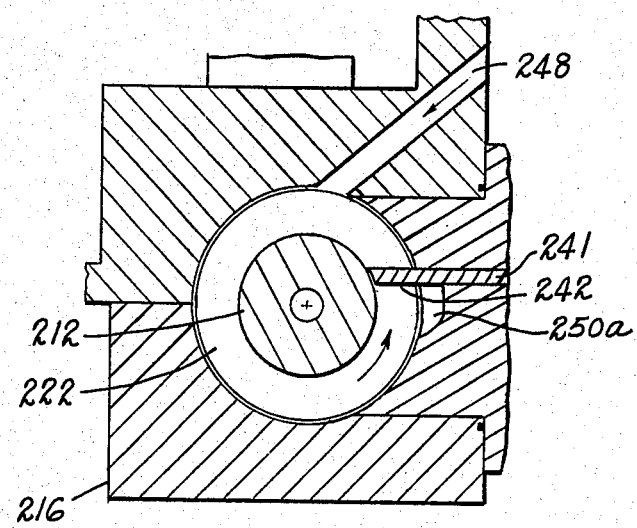
FIG. 13 is a simplified cross-sectional view of a feed passage of FIG. 11, taken along line XIII—XIII of FIG. 11.

Circumferential ribs 280 (FIGS. 11 and 12) are associated with housing 216 and are positioned at the periphery of the devolatilizing stage, to prevent vacuum line in a manner described in detail in above-referenced application Ser No. 532,156, included herein by reference. Temperature control means 282 illustrated in FIG. 11 is a series of chambers, as described for temperature control means 82 (FIG. 1), through which heat transfer fluid may be circulated in a known manner to heat or cool the channel walls of the processor to provide control of the temperature of the material during processing. The closure surface may also be provided with a similar temperature control means (not shown), if desired. FIG. 13 illustrates passage 222 of the feed stage. Passage 222 includes inlet 248, outlet 250a, and blocking member 241 which provides end wall surface 242 for passage 222. End wall surface 242 is spaced apart from inlet 248 a major portion of the circumferential distance about the passage, and is arranged near outlet 250a. In operation, liquid material is supplied gravitationally or by forced feeding to the processor by inlet 248, and is received into channel 221. The material is dragged by rotating walls 221a (FIG. 11) of channel 221 toward end wall surface 242. The main body of material is held by the end wall surface so that relative motion is established between the restrained main body of material and the material adjacent rotating walls 221a of the channel. This relative motion results in an increase in the temperature and pressure within the material as it approaches end wall surface 242, as described in above-referenced U.S. Pat. No. 4,194,841. At end wall surface 242, the material is collected for discharge through outlet 250a and transferred to the devolatilizing stage by way of transfer groove 250 (FIG. 12), which provides outlet 250a for passage 222 and inlet 250b for passage 224, the first passage of the first devolatilizing stage, as shown in FIGS. 12 and 14.

Figure 14:
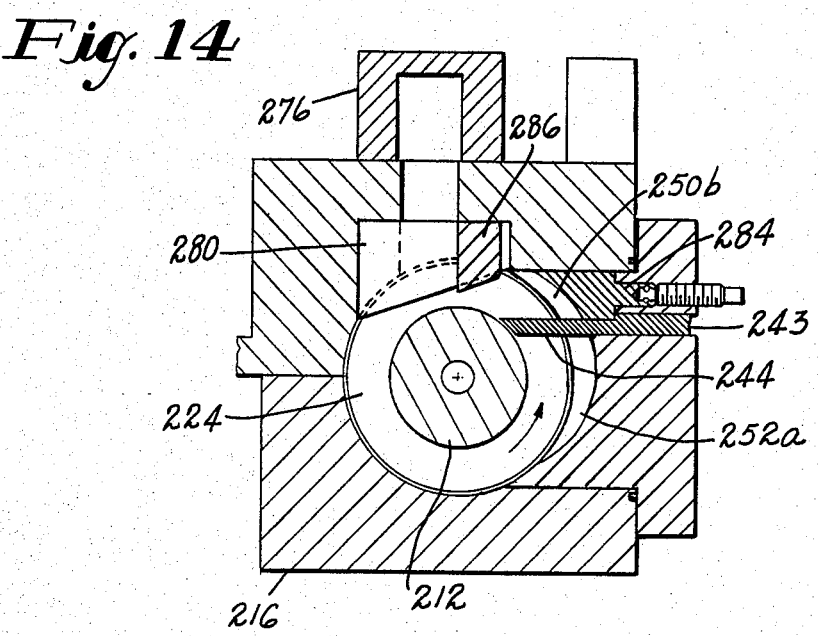
FIG. 14 is a simplified cross-sectional view of a first devolatilizing passage of FIG. 11, taken along line XIV—XIV of FIG. 11.
Figure 15:
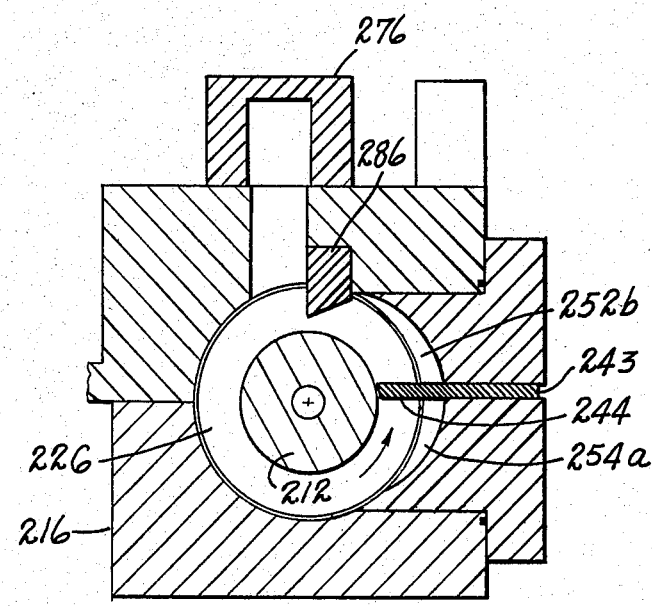
FIG. 15 is a simplified cross-sectional view of an intermediate devolatilizing passage of FIG. 11, taken along line XV—XV of FIG. 11.

Inlet 250b, illustrated in FIGS. 12 and 14 is relatively narrow in cross section, and generates the pressure and temperature increase upstream of inlet 250b in passage 222, thus providing complete filling of inlet 250b and preventing vacuum leakage through inlet 250b. Further precise control of the inlet temperature, pressure and vacuum sealing during operation may be achieved by providing inlet control gate 284 at inlet 250b of the first devolatilizing stage (FIG. 14). Control gate 284 may be arranged to be adjustable from outside the processor and constricts inlet opening 250 to a preselected degree, as described for control gate 84 (FIG. 2) and in further detail in above-referenced applications Ser. Nos. 532,165 and 532,157.

FIGS. 11, 12, 14, 15 and 16 illustrate the first devolatilizing stage comprising three devolatilizing passages: first devolatilizing passage 224, intermediate devolatilizing passage 226 and last devolatilizing passage 228. The geometry of each devolatilizing passage provides a processing volume capacity selected for coordination with other processing variables, as described above.

Each devolatilizing passage includes blocking member 243 providing end wall surface 244 for the passage, to collect the material for discharge from the passage. The spacing of each blocking member 243 about the circumference of the devolatilizing stage is selected to allow optimum design characteristics for transfer grooves 252 and 254. As mentioned, the transfer grooves and blocking members may be provided by removable transfer plates. Since the circumferential measurement of a transfer plate depends on the arrangement of the associated blocking members and transfer grooves, in the past the circumferential staggering of blocking members carried by a single transfer plate was kept to a minimum. However, the preferred arrangement of the first devolatilizing stage of FIG. 12 provides blocking members 243 which are progressively displaced from one another by a significant angular distance. This displacement or staggering can permit a significant increase in the width of transfer grooves 252 and 254 without an undesirably large increase in the axial distance across rotor surface 220 between devolatilizing channels, which in turn could result in a significant increase in the axial length of rotor 212. Accordingly, control of the cross-sectional areas, and thus control of the transfer volume capacities of transfer grooves 252 and 254 may be at least partly effected by the angular staggering of blocking members 243. For example, for a rotary processor having a rotor diaaeter of 7.5 in., an axial rotor surface width of 0.5 in. between devolatilizing channels and an angular displacement of 33.5° between blocking members, transfer grooves disposed at angle $\phi$ (FIG. 4) of 30° from the circumferential direction will have a width $W_t$ (FIG. 4) of 1.625 in.

Circumferential flow diverter 286 (FIGS. 14, 15 and 16) is provided for each devolatilizing passage to divert material to the root surface of the devolatilizing channel to minimize vacuum line plugging, as described in above-referenced application Ser. No. 532,156. The illustrated flow diverters 286 are part of flow diverter unit 285 (FIG. 11), but separate flow diverters may be used for each devolatilizing passage.

Figure 16:
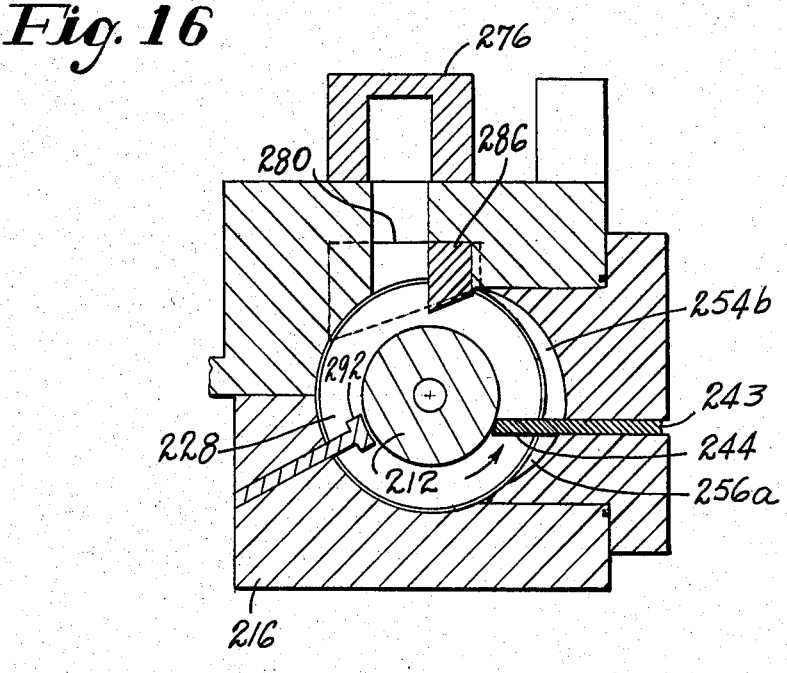
FIG. 16 is a simplified cross-sectional view of a last devolatilizing passage of FIG. 11, taken along line XVI—XVI of FIG. 11.

As shown in FIG. 16, last devolatilizing passage 228 includes optional non-pressurizing shearing element 292 which acts in a manner similar to shearing elements 92 (FIGS. 1-4) to provide an additional non-pressurizing shearing zone for the devolatilizing stage. Shearing elements 292 may also be included in the first and intermediate passages of the stage, and more than one shearing element may be provided for each passage if desired.

Relatively wide non-pressurizing transfer grooves 252 and 254 interconnect the passages of the first devolatilizing stage, as shown in FIG. 12. The geometries of transfer grooves 252 and 254 provide transfer volume capacities selected for coordination with other processing variables, as described above for non-pressurizing transfer groove 52.

Figure 17:
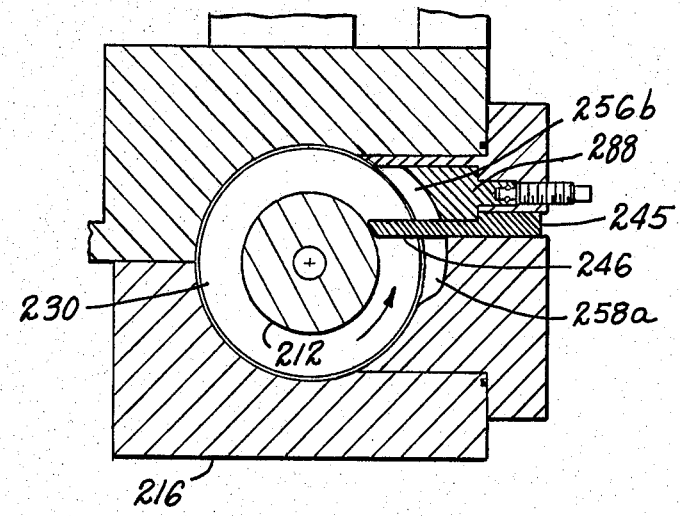
FIG. 17 is a simplified cross-sectional view of a mixing passage of FIG. 11, taken along line XVII—XVII of FIG. 11.

Relatively narrow transfer groove 256, shown in FIG. 12, provides outlet 256a from the first devolatilizing stage and inlet 256b to passage 230 of the mixing stage. Transfer groove 256 provides control of the outlet pressure and vacuum sealing of the first devolatilizing stage. Precise control of the outlet pressure and vacuum sealing during operation may be achieved by providing outlet volume control gate 288 at inlet 256b of processing passage 230, as shown in FIG. 17. Outlet volume control gate 288 may be arranged to be adjustable from outside the processor and constricts inlet opening 256b to a preselected degree, thus controlling the discharge pressure of material upstream at outlet 256a as well as the vacuum sealing of the stage, as is described in further detail in above-referenced applications Ser. Nos. 532,165 and 532,157.

In operation, liquid material enters devolatilizing passage 224 of the first devolatilizing stage at inlet 250b at a temperature and pressure controlled by the geometry of inlet 250b and by inlet volume control gate 284 (FIGS. 12 and 14), and is diverted toward the root of channel 223 by flow diverter 286. As the material passes the downstream edge of flow diverter 286 (or alternatively as it enters first devolatilizing passage 224 at inlet 250b), it is exposed to a vacuum drawn by a vacuum source (not shown) through vacuum manifold 276. The sudden drop in pressure causes flash foaming in the now superheated material as volatiles contained in the material vaporize, forming bubbles throughout the volume of the material. Because of the coordination of the flow rate of material entering passage 224 and the processing volume capacity of the passage with other processing variables described above, the foamed material undergoes no substantial shearing or increase in pressure as it is carried forward through the passage and is free to foam to the maximum degree in response to the temperature and vacuum level in the passage.

At end wall 244, the foamed material is collected for discharge from passage 224 through outlet 252a and is transferred to intermediate devolatilizing passage 226 through non-pressurizing transfer groove 252. The coordination of the volume of foamed material being processed in the first devolatilizing stage and the transfer volume capacity of transfer groove 252 with other processing variables described above provides a pool of foamed material collected at end wall 244 of passage 224 which is a relatively small, rapidly recirculating pool for generating high shear and constant surface renewal. Thus the bubbles of volatiles within the material are ruptured breaking down the foam and releasing the volatiles with minimal increase in pressure within the pool. Also transfer groove 252 provides a transfer volume capacity sufficient to allow rapid rotation of material within transfer groove 252 as rotor surface 220 rotates past the groove, causing further breakdown of the foam during transfer. Some of the heat lost from the material as the volatiles vaporize may be replaced as the foamed material contacts the surfaces of the processor, which may be either heated or cooled by temperature control means 282, as described above. Further heating of material results from the viscous dissipation within the shearing zones as shaft power is converted to heat energy. Thus the temperature of the material may be controlled and may be maintained at an essentially constant level.

From transfer groove 252, material enters intermediate devolatilizing passage 226 through inlet 252b (FIGS. 12 and 15), passes under flow diverter 286, is exposed to vacuum and is carried forward in plug-flow fashion to end wall 244 for non-pressurizing shearing and discharge through outlet 254a. Material passes through and is sheared within non-pressurizing transfer groove 254 (FIG. 12), enters last devolatilizing passage 228 through inlet 254b and passes under flow diverter 286 (FIG. 16). The foamed material is carried through passage 228 in plug-flow fashion toward shearing element 292, where its flow is obstructed so that a recirculating pool of material is formed upstream of shearing element 292 in a manner similar to that described for shearing element 92 (FIGS. 1-4). Shearing is induced within the material in the pool, rupturing the bubbles and releasing the volatiles for removal through vacuum manifold 276. As more material is carried toward the shearing element, the pool of material spills over the shearing element to be carried toward end wall 244 of last devolatilizing passage 228.

As the material is carried through and transferred between the devolatilizing passages, it is continually subject to vacuum and does not undergo any substantial increase in pressure. Accordingly, bubbles of volatiles continue to nucleate within the material, grow and rupture as described above until the material approaches end wall 244 of last devolatilizing passage 228 (FIGS. 12 and 16). The volatiles released by the rupture of the bubbles are withdrawn through vacuum manifold 276, which communicates with all of the passages of the first devolatilizing stage. At end wall 244 of passage 228, the material is collected for discharge from the devolatilizing stage through transfer groove 256 (FIG. 16), which provides outlet 256a from the stage.

As described above, transfer groove 256 is not a non-pressurizing transfer groove. Thus the pressure at which the material is discharged from the devolatilizing stage is determined in part by the cross-sectional size of outlet 256a and may be precisely controlled by control gate 288 (FIG. 17), described below. Accordingly, outlet 256a remains substantially completely full of material during operation to provide vacuum sealing at the outlet from the stage, as described above for outlet 56a (FIGS. 3 and 4). Since outlet 256a of the first devolatilizing stage is substantially full of material during operation, pressure is generated within the material collected at end wall 244 of last devolatilizing passage 228 to induce further breakdown of the foam, as described above for outlet 56a (FIGS. 3 and 4), and to discharge the material through relatively narrow outlet 256a for transfer through transfer groove 256 (FIG. 12) from the devolatilizing stage to passage 230 of the mixing stage (FIG. 17). The first devolatilizing stage described above has three devolatilizing passages providing five non-pressurizing shearing zones and interconnected by two non-pressurizing transfer grooves, but more passages may be provided, depending on processing conditions and the material being processed.

Passage 230 of the mixing stage, illustrated in FIGS. 12 and 17, includes blocking member 245 providing end wall surface 246 for the passage. The end wall surface is spaced apart from inlet 256b a major portion of the circumferential distance about the passage, and is arranged near outlet 258a provided by transfer groove 258. In operation, the devolatilized, substantially unfoamed material entering passage 230 is dragged by the rotating walls of channel 229 toward end wall surface 246. The main body of material is held by the end wall surface, so that the temperature and pressure of the material is increased as it travels through the passage in a manner similar to that described for passage 222 of the feed stage. As material continues to be dragged forward toward the end wall surface, a strong circulatory motion is established in the material collected at the end wall surface, resulting in a vigorous mixing action within the material. Transfer groove 258 (FIG. 12) provides outlet 258a for passage 230 and inlet 258b to the final devolatilizing stage, and may be of the same or different geometry as transfer groove 250 (which provides inlet 250b to the first devolatilizing stage), depending on the size selected for the recirculating pool at end wall 246 and the discharge pressure selected for the mixing stage.

If desired, the mixing stage may be modified to allow feeding into the passage of additional material and/or carrier substances which lower the partial pressures of the volatiles contained in the material before transferring it to the next devolatilizing stage. These may then be thoroughly mixed at end wall 246 of passage 230 with the material entering the passage from the first devolatilizing stage. One way of achieving this thorough mixing would be to include in the mixing passage a mixing structure and a port similar to those illustrated and described in the above-referenced U.S. Pat. No. 4,194,841 (FIG. 5 and column 8, line 60 to column 9, line 11), incorporated herein by reference.

As mentioned, the illustrated processor includes two devolatilizing stages separated by a mixing stage, but more or fewer stages may be necessary, depending on the material being processed and the concentration and properties of volatiles contained therein. Additionally, each mixing stage may have more than one passage, or any or all of the mixing stages may be eliminated.

The passages and transfer grooves of successive devolatilizing stages and the mixing stages, if any, separating them, as well as the first and intermediate passages, 232 and 234 respectively, and the devolatilizing transfer grooves, 260 and 262 respectively, of the final devolatilizing stage, are similar in characteristics to their counterparts already described. However, the specific geometries of each stage and the processing conditions in each stage provide optimum processing efficiency for the material entering that stage. Thus, as material travels through the processor, the material being discharged from successive devolatilizing stages has a progressively lower concentration of volatiles. The final devolatilizing stage—in the illustrated processor, the second devolatilizing stage—may have a last passage 236 (FIGS. 12 and 18) which varies in configuration from the last passage 228 of the upstream, first devolatilizing stage in that blocking member 269, providing end wall surface 270 for the passage is preferably spaced apart from inlet 262b approximately 270° or less about the circumference of the devolatilizing passage. Thus the pressures built up at end wall surface 270 and at the end wall surfaces of the remaining downstream passages of the processor can be arranged to at least partially balance pressures developed in upstream passages 222, 228 and 230. This balancing of pressures can significantly decrease shaft deflection and shaft bearing load, as described in referenced U.S. Pat. No. 4,227,816. This positioning of the end wall surfaces of the downstream passages of the processor can also provide a convenient position for the outlet from the pumping stage, described below.

Transfer groove 264, shown in FIG. 12, provides outlet 264a from the final devolatilizing stage and inlet 264b for an outboard homogenizing stage provided by passage 240. Outlet 264a and transfer groove 264 are relatively narrow in cross-section and are designed to provide control of the outlet pressure of the final devolatilizing stage in a manner similar to the control provided for the first devolatilizing stage by outlet 256a and transfer groove 256. Further precise control of the outlet pressure during operation may be provided by outlet volume control gate 290 (shown in FIG. 19) at inlet 264b of passage 240 of the homogenizing stage. Alternatively control gate 290 may be positioned elsewhere in transfer groove 256. Outlet volume control gate 290 may be designed to be adjustable from outside the processor and is designed to constrict inlet opening 264b to a preselected degree in a manner similar to control gate 288, described above and in above-referenced applications Ser. Nos. 532,165 and 532,157.

The relatively narrow cross-sections of transfer grooves 258 and 264, and the control of the inlet and outlet pressures of the devolatilizing stage provide substantially complete filling of transfer grooves 258 and 264, controlling vacuum leakage through inlet 258b and outlet 264a of the final devolatilizing stage.

Figure 18:
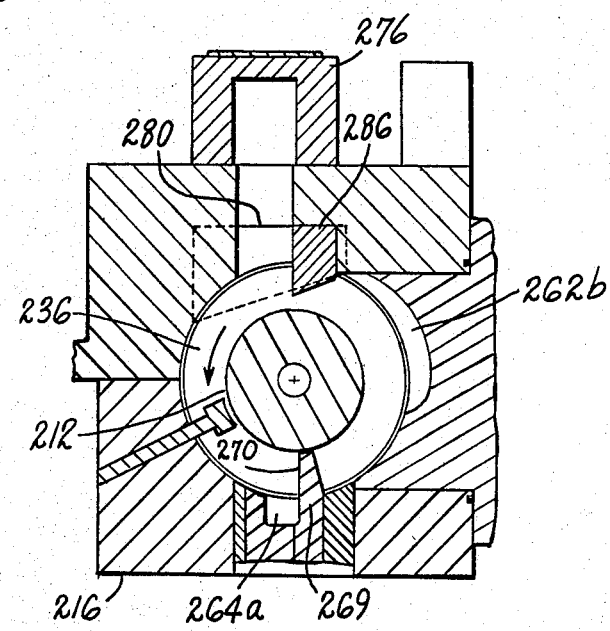
FIG. 18 is a simplified cross-sectional view of a last devolatilizing passage of a final devolatilizing stage of FIG. 11, taken along line XVIII—XVIII of FIG. 11.

In operation, the material in the final devolatilizing stage undergoes periods of plug-flow type travel through the devolatilizing passages and is exposed to vacuum through vacuum manifold 276 (FIG. 11) for unrestricted bubble formation and growth, and is sheared at non-pressurizing shearing zones for bubble rupture in a manner similar to that described for the first devolatilizing stage, until it reaches end wall 270 of the last devolatilizing passage of the stage (FIG. 18). In the preferred operation, the each successive devolatilizing stage is operated at a higher temperature and lower absolute pressure than the preceding first devolatilizing stage. This ensures that the foam devolatilization mechanism will occur in the material entering the final devolatilizing stage in spite of the lower concentration of volatiles. Since the cross-sectional area of outlet 264a of the final devolatilizing stage is controlled, sufficient pressure is generated within the material collected at end wall 274 of last devolatilizing passage 236 to assist in foam breakdown and discharge of the material through substantially full outlet 264a and transfer groove 264 from the final devolatilizing stage to outboard passage 240 of the homogenizing stage. The final devolatilizing stage described above has three passages, but more or fewer passages may be provided and the number of passages may be the same as or different from that of the first devolatilizing stage.

The arrangement and advantages of an outboard homogenizing passage and a high pressure pumping passage inboard of the lower pressure homogenizing passage are described in detail in commonly owned U.S. Pat. No. 4,411,532. As represented schematically by the larger arrows in FIG. 12, material processed in devolatilizing passage 236 is transferred to outboard homogenizing passage 240 through transfer groove 264 which passes across and is open to high pressure pumping passage 238. However, pumping passage 238 is designed to be sufficiently filled and to generate high pressures so that leakage of material from transfer groove 264 into passage 238 is minimal. This arrangement of the homogenizing and pumping passages provides special advantages in minimizing external leakage potential by lowering the pressures generated at the outboard end of the processor. Additionally, this arrangement provides a substantially constant discharge rate, and a substantially constant discharge temperature and pressure for the material being pumped from the processor, as described in above-referenced U.S. Pat. No. 4,411,532.

Figure 19:
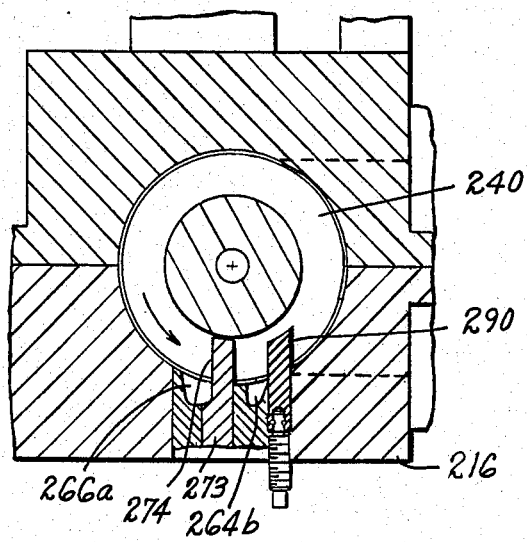
FIG. 19 is a simplified cross-sectional view of a homogenizing passage of FIG. 11, taken along line XIX—XIX of FIG. 11.

Referring to FIG. 19, passage 240 of the outboard homogenizing stage includes blocking member 273 providing end wall surface 274 for the passage. The end wall surface is preferably spaced apart from inlet 264b a major portion of the circumferential distance about the passage, and is arranged near outlet 266a provided by transfer groove 266 (FIG. 12). In operation, the devolatilized material is dragged by the rotating walls of passage 240 from inlet 264b and control gate 290 toward end wall surface 274. The main body of material is held by the end wall surface, in a manner similar to that described for passage 222 of the feed stage and passage 230 of the mixing stage. As material continues to be dragged forward toward the end wall surface, a strong circulatory motion is established in the material collected at the end wall surface, resulting in a vigorous mixing action within the material. This action provides a high quality, uniform material product for transfer to the pumping stage for discharge from the processor. Passage 240 is designed to be narrow relative to the feed, mixing and devolatilizing passages, so that it may generate sufficient pressure within the material to aid in discharge of the material through outlet 266a for transfer through transfer groove 266 to high pressure passage 238 of the pumping stage.

Figure 20:
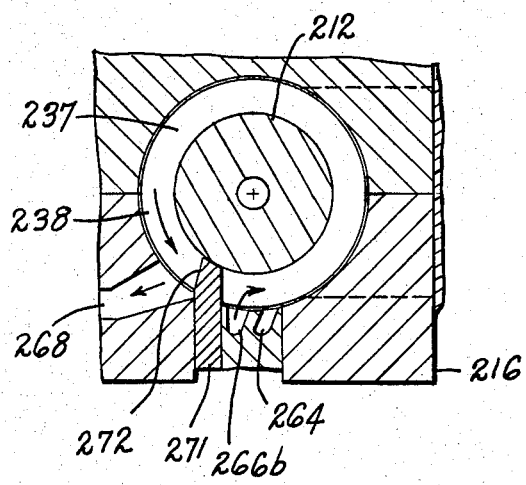
FIG. 20 is a simplified cross-sectional view of a pumping passage of FIG. 11, taken along line XX—XX of FIG. 11.

Pumping passage 238, illustrated in FIG. 20, is designed to function as a pressurizing or pumping stage for material processed in the rotary processor and includes inlet 266b and blocking member 271 providing end wall surface 272 for the passage. End wall surface 272 is preferably spaced apart from inlet 266b a major portion of the circumferential distance about the passage, and is arranged near outlet 268 which acts as a pump outlet for the processor. Channel 237 of passage 238 is very narrow relative to other processing channels of the processor (FIG. 11) and is designed to develop high pressure within the material dragged through the passage toward end wall surface 272 in the manner described in detail in above-referenced U.S. Pat. No. 4,194,841. In operation, material entering the pumping stage through inlet 266b is dragged forward by rotating walls 237a of channel 237 toward end wall surface 272 with a gradual buildup of pressure about the circumference of passage 238, reaching a maximum pressure at the end wall surface where it is discharged from the processor through outlet 268. If desired, outlet control means, such as a valve (not shown) may be provided at outlet 268 to provide control of the discharge from the processor and of the processing conditions in passage 238, as is described in above-referenced U.S. Pat. No. 4,411,532.

Although the processor described above is an especially preferred arrangement of processing stages, other arrangements are possible and are within the scope of the present invention. For example, a melting stage may be included to permit the feeding of particulate material to the processor for devolatilizing. The melting stage may be of the type described in detail in U.S. Pat. No. 4,389,119 referenced above.

Both the processor shown in FIGS. 1-4 and that shown in FIGS. 11-20 use inlet control gates to provide precise control of the pressure at the inlet to the devolatilizing stage, as described above. However, other means of providing inlet control may be used. For example, FIG. 21 is a schematic illustration of closure surface 318 of housing 316 of a rotary processor of the type described above. FIG. 21 shows the movement of material in the devolatilizing stage by means of arrows. Broken lines are used to show the relationship of devolatilizing passages 324 and 328 to closure surface 318. Blocking means 351 is positioned near inlet 350b of the devolatilizing stage to at least partially block the flow of material entering first devolatilizing passage 324 and to induce a pressure buildup in the material at the inlet. Blocking means 351 is associated with housing 316 and may be designed to permit the dragging of some of the material past blocking means 351 by the rotating channel surfaces, either at the channel root, as shown in FIG. 22 or at the side walls of the channel, in a manner similar to that described for the spreader block of above-referenced U.S. Pat. No. 4,329,065. The pressure buildup behind blocking means 351 forces material into clearance 319 (FIG. 22) between rotor surface 320 and closure surface 318, as shown by the arrows in FIG. 21. The rotation of rotor surface 320 drags the material in clearance 319 toward diagonal grooves 353 formed in closure surface 318 where it is collected, sheared by the movement of rotor surface 320 past grooves 323 and directed by the movement of rotor surface 320 toward passage 324. The pressure buildup behind blocking means 351 and/or the shearing within grooves 353 usually result in an increase in the temperature of the material. The material from diagonal grooves 353 enters passage 324 in the form of thin strands of material (FIGS. 21 and 22), which immediately undergo flash foaming as they are exposed to the vacuum in passage 324 provided by vacuum means V (FIG. 22). Inlet 350b, blocking means 351, diagonal grooves 353 and vacuum means V may be arranged in passage 324 so that the strands of material entering passage 324 will fall gravitationally for a predetermined distance before contacting any surface of the devolatilizing channel or other material, in a manner similar to that in a falling strand devolatilizer. One such arrangement is illustrated in FIG. 22. As the falling strands of material contact the rotating surfaces of the channel, they are carried toward end wall 344 and outlet 352a in the manner described above, for non-pressurizing shearing and discharge from the passage. An additional advantage of this arrangement is the minimizing of "barrel hangings", small amounts of material which are drawn into the devolatilizing passage usually near the inlet, by the vacuum means V, collecting on and depending from the stationary closure surface of the passage until the weight of the collected material causes it to separate from the closure surface. These barrel hangings can affect product quality, since their increased residence time in the processor may lead to polymer degradation. Additionally, plugging of the vacuum means can occur if "barrel hangings" are drawn into the vacuum means. the continuous movement of material through clearance 319, into grooves 353 and further into passage 324 provides a self-cleaning action in clearance 319 and on the closure surface portion near the inlet to minimize these problems.

FIG. 23 illustrates another means of providing control of the inlet pressure and providing a devolatilizing mechanism similar to that of a falling strand devolatilizer. In a devolatilizing stage similar to that described above, strand die 455 is inserted into inlet 450b of the stage. This obstruction to the flow of material into first devolatilizing passage 424 induces pressure behind die 455, which then forces the material through the die orifices, such as 455a. Inlet 250b to the stage, strand die 455 and vacuum means V may be arranged in the passage so that the strands of material will fall gravitationally, undergo flash foaming as they are exposed to the vacuum provided by vacuum means V, and be carried by the rotating surfaces of the channel toward end wall 444 and outlet 452a for non-pressurizing shearing and discharge from the passage, as described above for the material in passage 324. The use of strand die 455 is described in further detail in commonly owned, co-pending U.S. patent application Ser. No. 532,162, filed on the same day as this application by Z. Tadmor. Application Ser. No. 532,162 is incorporated herein by reference.

As may be seen from the embodiments described above, the invention presents to the art novel rotary processors having unexpectedly improved devolatilizing effects and overall processing performance characteristics as compared to rotary processors known to the art at the time this invention was made.

We claim:

1. A rotary processor for processing liquid materials containing volatiles dispersed therein and comprising a devolatilizing stage which comprises:
   (a) two or more annular devolatilizing channels carried by a rotatable element, each having opposed side walls extending radially inwardly from the surface of the rotatable element and enclosed by a coaxial closure surface provided by a stationary element to provide two or more annular devolatilizing passages;
   (b) a blocking member for each devolatilizing passage associated with the stationary element and extending into the channel to provide a material collecting end wall for the passage;
   (c) an inlet for each devolatilizing passage associated with the stationary element and positioned a major portion of the circumferential distance about the passage from the end wall, the inlet to the most upstream passage providing an inlet to the devolatilizing stage;
   (d) an outlet for each devolatilizing passage associated with the stationary element and positioned near the end wall, the outlet from the most downstream passage providing an outlet from the devolatilizing stage;
   (e) an intra-stage transfer groove formed in the closure surface to interconnect each adjacent pair of devolatilizing passages, the upstream end of the transfer groove providing the outlet from the more upstream of the adjacent pair of passages and the downstream end of the transfer groove providing the inlet to the more downstream of the adjacent pair of passages, so that material entering each passage at its inlet may be carried by the rotating channel side walls toward the end wall for collection, shearing and discharge through the outlet, and so that devolatilized material discharged from each devolatilizing passage except the most downstream passage may be transferred through the associated transfer groove to the next adjacent downstream passage for further devolatilizing, providing in-series operation of the passages of the devolatilizing stage;
   (f) vacuum means operationally arranged to remove volatiles from the devolatilizing stage and to maintain a predetermined vacuum level in the devolatilizing stage; and
   (g) sealing means to aid in maintaining the vacuum level in the stage; and wherein
   (h) the vacuum level in the devolatilizing stage is capable of inducing foaming as bubbles containing volatiles are formed in the material processed in the devolatilizing stage; and wherein
   (i) the processing volume capacity of each devolatilizing passage and the transfer volume capacity of each intra-stage transfer groove are capable of coordination with the processing rate, with the rate of rotation of the rotatable element and with the vacuum level, so that the formed material occupies no more than a predetermined portion of the processing volume capacity of each devolatilizing passage and of the transfer volume capacity of each intra-stage transfer groove, permitting the material to be carried through a portion of each passage in a substantially plug-flow fashion for substantially unrestrained formation and growth of the bubbles in the material, and permitting shearing of the foamed material for bubble rupture and release of the volatiles with minimal repressurization of the material at non-pressurizing shearing zones at the end wall of each devolatilizing passage except the most downstream passage and within each intra-stage transfer groove; and in which
   (j) clearances are provided between the portions of the rotatable element adjacent the channel side walls of the most upstream passage of the devolatilizing stage and the closure surface; and further including (k) means to control the inlet pressure comprising a blocking means associated with the stationary element and extending into the most upstream passage of the stage near the inlet to at least partially block and to induce an increase in pressure within the material entering the stage, forcing at least some of the material into the clearances and diagonal grooves formed in the portions of the closure surface adjacent the clearances and downstream of and near the inlet so that material entering the clearances is dragged toward the diagonal grooves by the rotating surface of the rotatable element, is collected in the diagonal grooves, is directed by the coaction of the diagonal grooves and the rotating surface of the rotatable element toward the most upstream devolatilizing passage and enters the most upstream devolatilizing passage downstream of the blocking means in the form of strands of material.

2. Apparatus of claim 1 in which the inlet to the devolatilizing stage, the blocking means, the diagonal grooves and the vacuum means are disposed about the circumference of the most upstream devolatilizing passage so as to permit the strands of material to fall gravitationally a predetermined distance before contacting any additional material or rotating channel surfaces.

3. A method of processing liquid material containing volatiles dispersed therein comprising the steps of:
  (a) introducing the material at a processing rate at a feed point to a devolatilizing zone having
    (i) at least two substantially annular processing zones, each defined by two rotatable, substantially circular walls, a coaxial, rotatable, substantially annular root surface connecting the walls at their radially inward portion, a coaxial, stationary surface enclosing the processing zone, and a stationary processing zone end wall, each processing zone having an inlet point, the inlet point of the most upstream processing zone providing the feed point of the devolatilizing zone, and an outlet point near the end wall and spaced apart from the inlet point, the outlet point of the most downstream processing zone providing a discharge point for the devolatilizing zone, and
    (ii) a transfer zone interconnecting each adjacent pair of processing zones, and defined by a stationary groove and an annular closure surface rotatable at an angle relative to the groove, and wherein the upstream end of each groove is open to the more upstream processing zone of the associated pair of processing zones at its outlet point and the downstream end of the groove is open to the more downstream processing zone of the associated pair of processing zones at its inlet point, and wherein the processing volume capacity of each processing zone and the transfer volume capacity of each transfer zone are capable of coordination with other processing conditions so that the volatile containing material occupies no more than a predetermined portion of the processing volume capacity of each processing zone and of the transfer volume capacity of each transfer zone;
  (b) maintaining a vacuum in the devolatilizing zone capable of inducing foaming as bubbles containing volatiles are formed in the material;
  (c) rotating the walls and the root surfaces of the processing zones at substantially equal velocities, in the same direction from the feed point toward the end wall, thereby carrying the material forward through each processing zone, the rate of rotation being coordinated with the processing volume capacity, the vacuum level, the processing rate and the characteristics of the material in the processing zone, so that the material travels in undisturbed, plug-flow fashion for a portion of its residence time in each processing zone, permitting substantially unrestrained formation and growth of bubbles within the material;
  (d) collecting the material as a rapidly recirculating pool at the end wall of each processing zone except the most downstream processing zone;
  (e) discharging the material from each processing zone except the last processing zone at its outlet point to the transfer zone interconnecting the processing zone to the next adjacent downstream processing zone;
  (f) rotating the closure surface of each transfer zone relative to the stationary groove, thereby carrying the material downstream through each transfer zone to the inlet point of the next adjacent downstream processing zone, the rate of rotation being coordinated with the transfer volume capacity, the vacuum level, the processing rate and the characteristics of the material in the processing zone so that shearing may be induced within the material in each transfer zone and at the end wall of each processing zone except the most downstream processing zone with minimal pressurization for bubble rupture and release of the volatiles;
  (g) precisely controlling the feed pressure of the devolatilizing zone during operation including at least partially blocking the material entering the devolatilizing zone in such a way as to introduce at least a portion of the material to the devolatilizing zone in the form of strands of material;
  (h) allowing the strands of material to fall gravitationally a predetermined distance before contacting any additional material or the rotating processing zone walls or root surfaces;
  (i) removing the released volatiles from the devolatilizing zone;
  (j) collecting the material as a rapidly recirculating pool of controlled size and pressure at the end wall of the most downstream processing zone; and
  (k) discharging the devolatilized material from the discharge point of the devolatilizing zone.

4. A method of devolatilizing liquid material containing volatiles dispersed therein comprising the steps of:
  (a) introducing the material at a processing rate at a feed inlet to a devolatilizing processor having at least two substantially annular channels each having opposed side walls and a root surface, the channels being carried by a rotor and enclosed by a closure surface of a housing to form annular devolatilizing passages, each passage having an inlet, an outlet and a blocking member providing an end wall all associated with the closure surface, the inlet of the most upstream passage providing the feed inlet and the outlet of the most downstream passage providing a discharge outlet, the devolatilizing processor also having a transfer groove interconnecting each adjacent pair of passages, each transfer groove being formed in the closure surface and providing the outlet of a more upstream passage and the inlet of a more downstream passage so that the passages are interconnected in series for transfer of the material from the most upstream to the most downstream passage;

(b) carrying the material through each passage by rotating the rotor;

(c) collecting the material at each end wall as a recirculating pool;

(d) transferring the material serially from the most upstream to the most downstream passage through the transfer grooves;

(e) maintaining a vacuum level in at least the devolatilizing passages for removal of volatiles;

(f) discharging the material through the discharge outlet; and characterized by the steps of:

(g) encouraging substantially unrestricted formation and growth of bubbles of volatiles within the material by coordinating the processing volume capacity of each devolatilizing passage, the rate of rotation of the rotor, the vacuum level, the processing rate and the characteristics of the material in such a way that each passage is only partially filled with material so that the material travels under vacuum in substantially undisturbed, non-pressurized, plug-flow fashion for a portion of its residence time in each processing passage; and (h) inducing non-pressurizing shearing within the material in each transfer groove and at the end wall of each passage except the most downstream passage by coordinating the transfer volume capacity of each transfer groove, the rate of rotation of the rotor, the vacuum level, the processing rate and the characteristics of the material in such a way that each transfer groove is only partially filled with material so that the bubbles are ruptured and the volatiles are released with minimal repressurization of the material and minimal redissolution of the volatiles.

5. A method according to claim 4 further comprising the step of precisely controlling the feed and/or discharge pressure(s) of the devolatilizing zone passages during operation.

6. A method according to claim 5 in which the step of controlling the feed pressure includes at least partially blocking the material entering the devolatilizing passages in such a way as to introduce at least a portion of the material to the devolatilizing passages in the form of strands of material.

7. A method according to claim 4 wherein the material is introduced to the devolatilizing passages at a processing rate of 50–200 lb/hr, the vacuum is maintained at 1–760 mm Hg and the rotor is rotated at a speed of 20–200 RPM.

8. A method according to claim 4 wherein the material introduced to the devolatilizing passages has a temperature of 350°–550° F., a viscosity of 1–400 MI and a volatile concentration of 400 ppm—10%.

9. A method according to claim 4 further comprising the step of maintaining the temperature of the material in the devolatilizing zone at or near the temperature of the material at the feed inlet.

* * * * *